(12) United States Patent
Penke

(10) Patent No.: US 11,997,445 B2
(45) Date of Patent: May 28, 2024

(54) SYSTEMS AND METHODS FOR LIVE CONVERSATION USING HEARING DEVICES

(71) Applicant: Samsung Electronics Company, Ltd., Gyeonggi-do (KR)

(72) Inventor: Siva Penke, San Jose, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 423 days.

(21) Appl. No.: 17/341,920

(22) Filed: Jun. 8, 2021

(65) Prior Publication Data
US 2021/0392427 A1 Dec. 16, 2021

Related U.S. Application Data

(60) Provisional application No. 63/038,253, filed on Jun. 12, 2020.

(51) Int. Cl.
*G06F 3/16* (2006.01)
*G06F 3/01* (2006.01)
(Continued)

(52) U.S. Cl.
CPC ........... *H04R 1/1041* (2013.01); *G06F 3/017* (2013.01); *G06F 3/165* (2013.01); *G06F 3/167* (2013.01);
(Continued)

(58) Field of Classification Search
CPC .......................... H04R 1/1041; H04R 1/1016; H04R 2420/07; G06F 3/017; G06F 3/165; G06F 3/167; H04M 1/6066; H04M 2250/02
See application file for complete search history.

(56) References Cited

U.S. PATENT DOCUMENTS

| | | |
|---|---|---|
| 9,949,040 B2 | 4/2018 | Bergmann |
| 10,205,814 B2 | 2/2019 | Boesen |

(Continued)

FOREIGN PATENT DOCUMENTS

| | | |
|---|---|---|
| KR | 2016-0036459 A | 4/2016 |
| KR | 2018-0107637 A | 10/2018 |
| KR | 2019-0080305 A | 7/2019 |

OTHER PUBLICATIONS

International Search Report and Written Opinion for International Application No. PCT/KR2021/007303, 9 pages, dated Sep. 16, 2021.

*Primary Examiner* — Joseph Saunders, Jr.
*Assistant Examiner* — Joseph Saunders

(57) ABSTRACT

In one embodiment, a method includes, by a first electronic device: receiving, from an input sensor of the first electronic device, a predetermined input, where the predetermined input corresponds to a request to wirelessly connect the first electronic device to one or more second electronic devices within a communication range of a transceiver of the first electronic device, wirelessly connecting, using the transceiver of the first electronic device responsive to receiving the predetermined input, to the one or more second electronic devices using a communications profile associated with each of the one or more second electronic devices, where the communications profile includes one or more parameters for verifying to connect the first electronic device and the one or more second electronic devices, and redirecting a live audio communication between the first electronic device and a control device to the one or more second electronic devices.

20 Claims, 12 Drawing Sheets

(51) Int. Cl.
*H04M 1/60* (2006.01)
*H04R 1/10* (2006.01)

(52) U.S. Cl.
CPC ........ *H04M 1/6066* (2013.01); *H04R 1/1016* (2013.01); *H04M 2250/02* (2013.01); *H04R 2420/07* (2013.01)

(56) References Cited

U.S. PATENT DOCUMENTS

| | | | |
|---|---|---|---|
| 10,206,024 B2 | 2/2019 | Fleizach | |
| 10,291,591 B2 | 5/2019 | Yu | |
| 10,531,247 B2 | 1/2020 | Kashef | |
| 2006/0258289 A1* | 11/2006 | Dua | H04W 8/005 455/41.3 |
| 2019/0102145 A1* | 4/2019 | Wilberding | H04N 21/4394 |
| 2019/0222917 A1 | 7/2019 | Perry | |
| 2019/0246196 A1 | 8/2019 | Han | |
| 2019/0356980 A1 | 11/2019 | Koss | |
| 2019/0379964 A1 | 12/2019 | Pergament | |
| 2020/0120727 A1 | 4/2020 | Batta | |

\* cited by examiner

SYSTEMS AND METHODS FOR LIVE CONVERSATION USING HEARING DEVICES

PRIORITY

This application claims the benefit under 35 U.S.C. § 119(e) of U.S. Provisional Patent Application No. 63/038,253, filed 12 Jun. 2020, which is incorporated herein by reference.

TECHNICAL FIELD

This disclosure relates generally to headset devices, and in particular relates to wireless communication of headset devices.

BACKGROUND

Wireless headsets are increasingly being used by people. These wireless headsets use, for example, Bluetooth connectivity to transmit the audio signal by radio waves from source devices like cellphones and digital players. Many wireless headsets include both headphones and microphone to enable telecommunication. The wireless headset may enable a user to perform other tasks without restrictions of a wired connection to a device.

DESCRIPTION OF EXAMPLE EMBODIMENTS

Mobile Client System Overview

Figure 1:
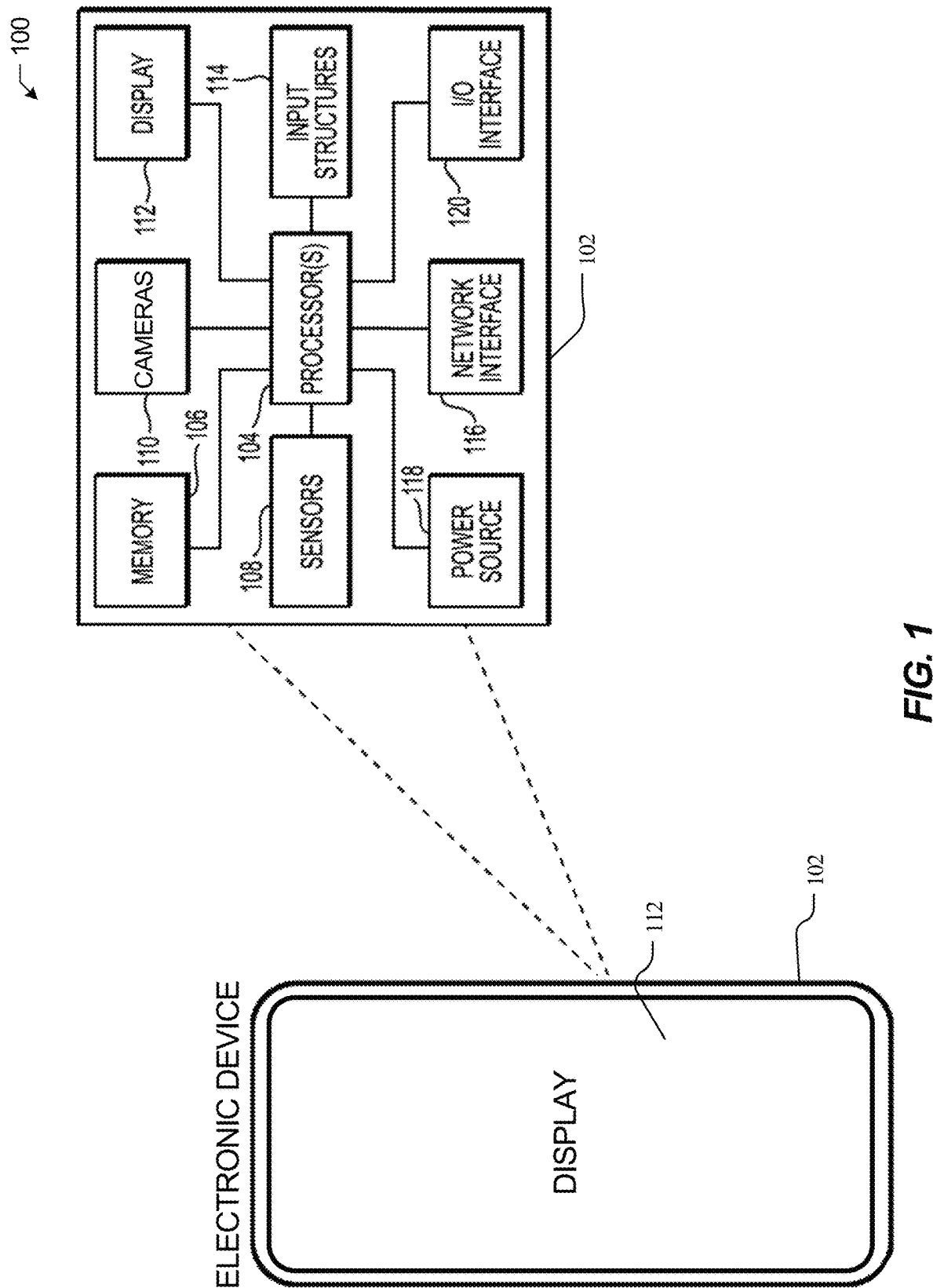
FIG. 1 illustrates an example mobile electronic device.

FIG. 1 illustrates an example electronic device 100, in accordance with presently disclosed embodiments. In particular embodiments, the electronic device 100 may include, for example, any of various personal electronic devices 102, such as a mobile phone electronic device, a tablet computer electronic device, a laptop computer electronic device, and so forth. In particular embodiments, as further depicted by FIG. 1, the personal electronic device 102 may include, among other things, one or more processor(s) 104, memory 106, sensors 108, cameras 110, a display 112, input structures 114, network interfaces 116, a power source 118, and an input/output (I/O) interface 120. It should be noted that FIG. 1 is merely one example of a particular implementation and is intended to illustrate the types of components that may be included as part of the electronic device 100.

In particular embodiments, the one or more processor(s) 104 may be operably coupled with the memory 106 to perform various algorithms, processes, or functions. Such programs or instructions executed by the processor(s) 104 may be stored in any suitable article of manufacture that includes one or more tangible, computer-readable media at least collectively storing the instructions or routines, such as the memory 106. The memory 106 may include any suitable articles of manufacture for storing data and executable instructions, such as random-access memory (RAM), read-only memory (ROM), rewritable flash memory, hard drives, and so forth. Also, programs (e.g., an operating system) encoded on such a computer program product may also include instructions that may be executed by the processor(s) 104 to enable the electronic device 100 to provide various functionalities.

In particular embodiments, the sensors 108 may include, for example, one or more cameras (e.g., depth cameras), touch sensors, microphones, motion detection sensors, thermal detection sensors, light detection sensors, time of flight (ToF) sensors, ultrasonic sensors, infrared sensors, or other similar sensors that may be utilized to detect various user inputs (e.g., user voice inputs, user gesture inputs, user touch inputs, user instrument inputs, user motion inputs, and so forth). The cameras 110 may include any number of cameras (e.g., wide cameras, narrow cameras, telephoto cameras, ultra-wide cameras, depth cameras, and so forth) that may be utilized to capture various 2D and 3D images. The display 112 may include any display architecture (e.g., AMLCD, AMOLED, micro-LED, and so forth), which may provide further means by which users may interact and engage with the electronic device 100. In particular embodiments, as further illustrated by FIG. 1, one more of the cameras 110 may be disposed behind, underneath, or alongside the display 112 (e.g., one or more of the cameras 110 may be partially or completely concealed by the display 112), and thus the display 112 may include a transparent pixel region and/or semi-transparent pixel region through which the one or more concealed cameras 110 may detect light, and, by extension, capture images. It should be appreciated that the one more of the cameras 110 may be disposed anywhere behind or underneath the display 110, such as at a center area behind the display 110, at an upper area behind the display 110, or at a lower area behind the display 110.

In particular embodiments, the input structures 114 may include any physical structures utilized to control one or more global functions of the electronic device 100 (e.g., pressing a button to power "ON" or power "OFF" the electronic device 100). The network interface 116 may include, for example, any number of network interfaces suitable for allowing the electronic device 100 to access and receive data over one or more cloud-based networks (e.g., a cloud-based service that may service hundreds or thousands of the electronic device 100 and the associated users corresponding thereto) and/or distributed networks. The power source 118 may include any suitable source of power, such as a rechargeable lithium polymer (Li-poly) battery and/or an alternating current (AC) power converter that may be utilized to power and/or charge the electronic device 100 for operation. Similarly, the I/O interface 120 may be provided to allow the electronic device 100 to interface with various other electronic or computing devices, such as one or more auxiliary electronic devices.

Figure 2:
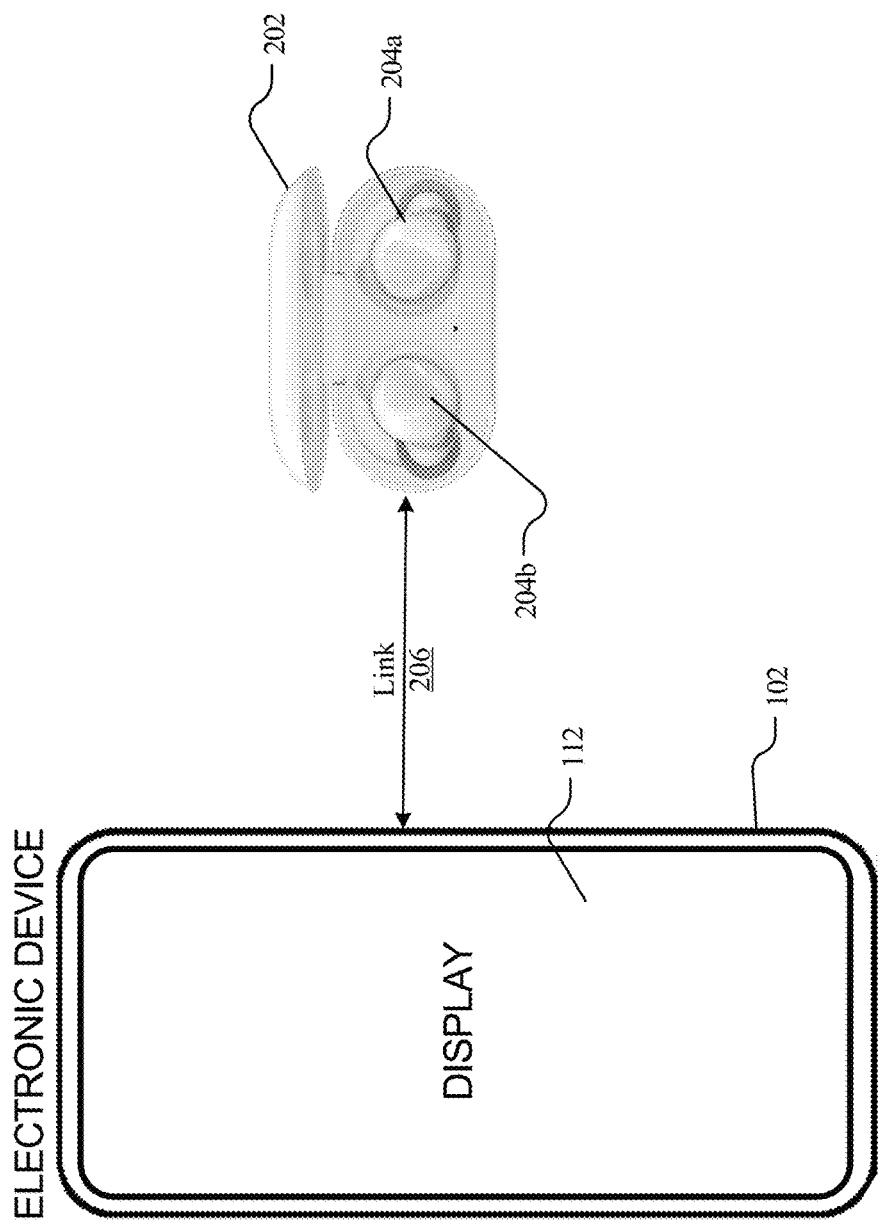
FIG. 2 illustrates an example wireless connection environment including an electronic device connected to an example hearing device.

FIG. 2 illustrates example wireless connection environment 200 including an electronic device 102 connected to an example hearing device 202 via link 206. In particular embodiments, the hearing device 202 may include one or more earpieces 204a, 204b. In particular embodiments, the electronic device 102 may be embodied as a mobile phone electronic device, tablet computer electronic device, a laptop computer electronic device, and so forth. In particular embodiments, the electronic device 102 may be configured to provide or stream audio either wirelessly and/or through one or more wires (not shown). In particular embodiments, the link 206 may be a wireless communication protocol. As an example and not by way of limitation, the link 206 may be Bluetooth, a Wi-Fi compliant network, or other communication protocol.

Figure 3:
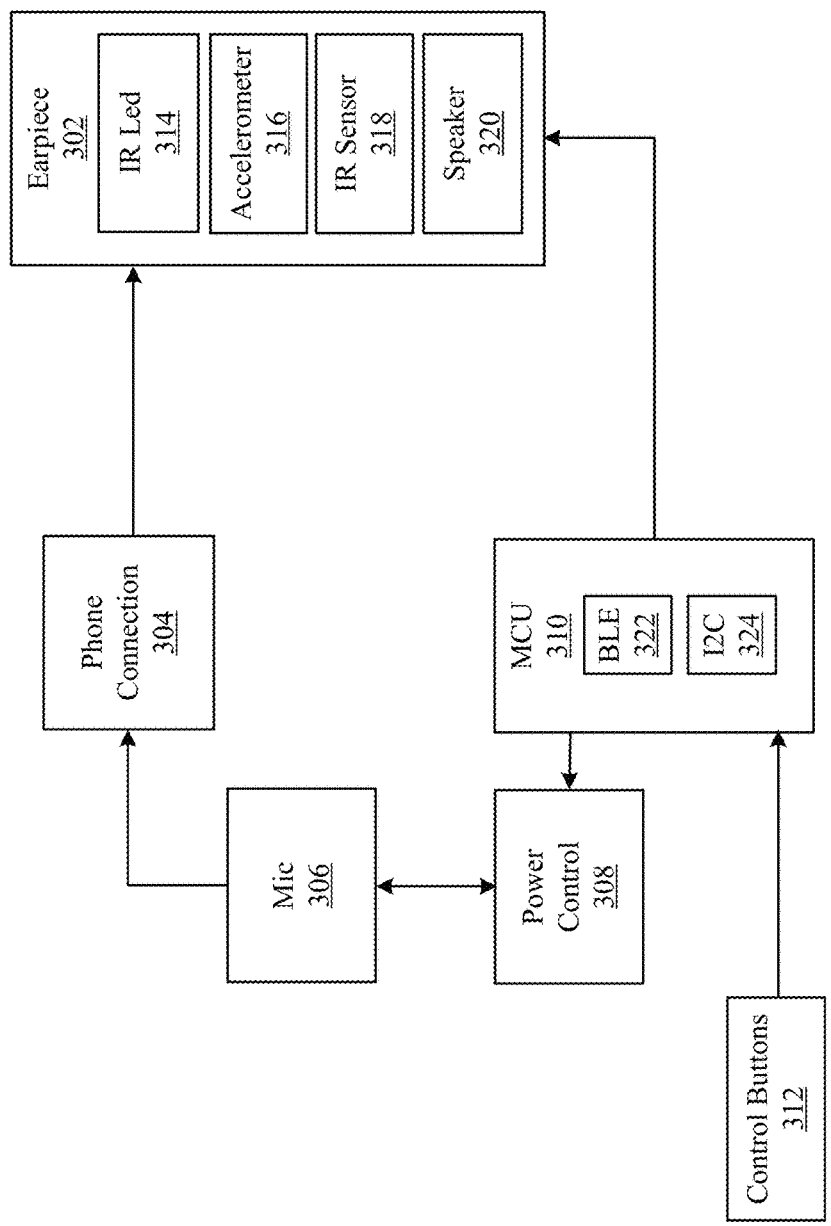
FIG. 3 illustrates an example hearing device architecture.

FIG. 3 illustrates an example hearing device architecture 300. In particular embodiments, the hearing device architecture 300 may correspond to at least the hearing device 202 or another component of the wireless connection environment 200. In particular embodiments, the hearing device architecture 300 may include an example earpiece 302, phone connection 304, microphone (mic) 306, power control 308, microcontroller unit (MCU) 310, and control buttons 314. One or more of the components of the hearing device architecture 300 may be implemented in a wired, wireless, or combination of wired and wireless environments. In particular embodiments, the earpiece 302 may include a speaker 320 for playback of audio output, an accelerometer 316 for motion sensing, an IR LED 314 and IR sensor 318 for pulse rate detection. In particular embodiments, the IR LED 314 and IR sensor 318 may be embodied as another device for pulse rate detection. Although a number of components are shown in a particular configuration, this disclosure contemplates any configuration of the architecture 300, where one or more components may be added or removed from the architecture 300 and connected in a different way than as shown.

In particular embodiments, the accelerometer 316 may be configured to sense motions of the user. As an example and not by way of limitation, the accelerometer 316 may be a 3D accelerometer. While this disclosure describes using an accelerometer 316, the disclosure contemplates using an inertial measurement unit (IMU) in addition to or in replacement of the accelerometer 316. The accelerometer 316 may instantly detect a change in the motion pattern of a user, as well as monitor trends in motion. As an example and not by way of limitation, a user may at a certain time be walking, and at a time later start jogging. The accelerometer 316 may detect accelerations, i.e. changes in movements. For instance, the acceleration or movement pattern would be different between when the user walks, jogs, or sprints. As the accelerometer 316 detects such changes in motion, the example MCU 310 may receive the corresponding sensor data from the accelerometer 316, determine the state of the user, and control the one or more components of the architecture 300 according to a predetermined setting. As an example and not by way of limitation, one or more motion sensors may be located in one or both of the earpieces 302 of the architecture 300. Thereby, through measurements of the accelerometer 316, motions of the head of the user may be registered.

In particular embodiments, in addition to using sensor data from an accelerometer 318 for determining a state of the user, the data from the IR sensor 318 may be filtered so as to avoid disturbance sensor data by filtering out motion artifacts that correspond to the detected relative motions between the earpiece 302 and the ear of the user as detected by the accelerometer 316. In particular embodiments, a second accelerometer may be implemented in the architecture 300.

In particular embodiments, the MCU 310 may be communicatively connected to one or more earpieces 302 As an example and not by way of limitation, the MCU 310 may be an included component of the earpiece 302. A control of the adjustment or the selection of audio output by the MCU 310 may be automatically or autonomously performed by the MCU 310. In particular embodiments, one or more of the data from the accelerometer 316 or IR LED 314 and IR sensor 318 may be offloaded to an electronic device 102. One or more operations to determine the state of the user and the providing, adjusting, and/or selecting playing of audio output through speaker 320 may be performed in a distributed manner. The MCU 310 may include Bluetooth low energy (BLE) 322 and $I^2C$ circuit 324. The MCU 310 may include other standardized wireless communication protocols.

In particular embodiments, the power control unit 310 may be included in the architecture for controlling when the different components are to be activated, deactivated, and inactive.

In particular embodiments, the architecture 300 may include microphone 306. The microphone 306 may be included in the earpiece 302. As an example and not by way of limitation, a microphone 306 may be included in a pair of earpieces 302. The microphone 306 may be used to record a sound from the user, such as for handling a phone call or voice command for a connected electronic device 102. In particular embodiments, the MCU 310 may control the microphone 306 to capture ambient sounds and based on the captured ambient sounds, the MCU 310 may control the volume of the audio output to be increased or decreased.

In particular embodiments, the control buttons 312 may be located on the earpiece 302. The control buttons 312 may be physical buttons, a capacitive sensor, or another type of sensor. The control buttons 312 may receive input to control the audio output of the earpiece 302. As an example and not by way of limitation, the control buttons 312 may enable a play/pause/stop function, a fast-forward function, a rewind function, and the like. In particular embodiments, the control buttons 312 may include one or more buttons to perform one or more functions. In particular embodiments, the control buttons 312 may be configured to receive different inputs to perform one or more functions. As an example and not by way of limitation, the control buttons 312 may be configured to receive a double-tap input to perform a different function than a function corresponding to a single-tap input.

Live Conversation Using Hearing Devices

In particular embodiments, the disclose technology includes a system for live audio communication. The live audio communication may be enabled between two wireless hearing devices. As an example and not by way of limitation, the system may enable a direct live audio communication between two Bluetooth headsets. In particular embodiments, a control device may initially connect to two different hearing devices. The control device may be embodied as a mobile phone electronic device, a tablet computer electronic device, a laptop computer electronic device, and so forth. The control device may establish a connection between the two different hearing devices to enable live audio communication between the two hearing devices. As an example and not by way of limitation, a control device may initially connect to two different Bluetooth headsets. The control device may then establish a live audio communication between the two different Bluetooth headsets by redirecting live audio communication between a first Bluetooth headset and the control device to a second Bluetooth headset. In particular embodiments, subsequently to the control device establishing the connection, the two different hearing devices may directly connect to each other for a live audio communication without the control device. In particular embodiments, a communications profile may be used to verify whether a live audio communication should be established between a first hearing device and a second hearing device or to verify whether a live audio communication should be redirected between a first hearing device and a control device to a second hearing device. The communications profile may be used to securely enable the live audio communication such that no unwanted user may establish live audio communication with a hearing device of another user. In particular embodiments, the communications profile may be associated with each hearing device. The communications profile may include one or more parameters for verifying to connect a hearing device to another hearing device. In particular embodiments, the communications profile may be embodied as a Bluetooth profile. The communications profile may indicate a predetermined input that must be received in order to initiate a process to establish a live audio communication between two different hearing devices. As an example and not by way of limitation, two different hearing devices may include a communications profile that indicates a received motion (e.g., a shake) must be received to initiate a process to connect to another hearing device. Additionally, the communications profile may indicate that the received motion must be received within a time period of another received motion. As an example and not by way of limitation, the communications profile may require that two users shake their hearing devices at a time that is within a threshold time period (e.g., 1 second). The hearing devices may establish a live audio communication if the conditions/prerequisites of the communications profile are satisfied. Although this disclosure describes live audio communication in a particular manner, this disclosure contemplates live audio communication in any suitable manner.

Certain technical challenges exist for live audio communication. Without the use of devices, users may have difficulty understanding one another as a result of environmental factors. As an example and not by way of limitation, if a person is wearing a face cover (e.g., a mask) the person may be hard to understand. As another example and not by way of limitation, if two people having a conversation are far apart, then each person may have difficulty talking to one another. Two people may also be having a conversation in a noisy environment. A solution presented by the embodiment disclosed herein to address these challenges may be to implement a live audio communication between two hearing devices. A control device may be used to establish the live audio communication between two or more hearing devices. By enabling live audio communication between two hearing devices, two people may be able to clearly hear each and converse with one another. Certain embodiments disclosed herein may provide one or more technical advantages. A technical advantage of the embodiments may include a secure and fast method of connecting two or more hearing devices to enable a live audio communication between the devices. Certain embodiments disclosed herein may provide none, some, or all of the above technical advantages. One or more other technical advantages may be readily apparent to one skilled in the art in view of the figures, descriptions, and claims of the present disclosure.

In particular embodiments, a first electronic device may receive a predetermined input. In particular embodiments, the first electronic device may be embodied as a hearing device (e.g., hearing device 202 including earpieces 204a, 204b). The first electronic device may be connected to a control device. As an example and not by way of limitation, the first electronic device may be wirelessly connected to a control device, such as via Bluetooth. While this disclosure describes a first electronic device performing certain functions, a control device may be used in conjunction or in replacement of the first electronic device to perform one or more functions. The first electronic device may receive the predetermined input from an input sensor of the first electronic device. As an example and not by way of limitation, the input sensor may be embodied as one or more of a microphone, an inertial measurement unit (IMU), a touch sensor, or the like. In particular embodiments, the predetermined input may be embodied as one or more of an audio input, a received motion, a touch gesture, or the like. In particular embodiments, the predetermined input may correspond to a request to wirelessly connect the first electronic device to one or more second electronic devices. As an example and not by way of limitation, the predetermined input may be a request to connect a first hearing device to a second hearing device to enable a live audio communication. In particular embodiments, the request may be for one or more second electronic devices that are within a communication range of a transceiver of the first electronic device. As an example and not by way of limitation, the transceiver of the first electronic device may be used to establish a communication range of which the first electronic device requests to wirelessly connect to other devices. For instance, if the transceiver has a range of 200 m, then the first electronic device may request to only communicate with second electronic devices within the 200 m range. In particular embodiments, the predetermined input may be associated with an audio redirection function of a control device. In particular embodiments, the control device may be embodied as a mobile phone electronic device, a tablet computer electronic device, a laptop computer electronic device, and so forth. In particular embodiments, the predetermined input may initiate a trigger signal and/or initiate a detection of a trigger signal. As an example and not by way of limitation, the predetermined input may initiate a process to establish a live audio communication. Although this disclosure describes receiving a predetermined input in a particular manner, this disclosure contemplates receiving a predetermined input in any suitable manner.

In particular embodiments, the first electronic device may wirelessly connect to one or more second electronic devices. The first electronic device may use a communications profile associated with each second electronic device to wirelessly connect to each of the second electronic devices. As an example and not by way of limitation, the first electronic device may use a communications profile associated with a second electronic device to determine parameters that need to be verified to connect to the second electronic device. In particular embodiments, the communications profile may comprise one or more parameters for verifying to connect the first electronic device and the one or more second electronic devices. As an example and not by way of limitation, the communications profile may indicate that a text keyword needs to be received to initiate an audio redirection function of a control device. Although this disclosure describes wirelessly connecting a first electronic device to one or more second electronic devices in a particular manner, this disclosure contemplates wirelessly connecting a first electronic device to one or more second electronic devices in any suitable manner.

In particular embodiments, the first electronic device may redirect a live audio communication. The first electronic device may redirect a live audio communication between the first electronic device and a control device to one or more second electronic devices. As an example and not by way of limitation, if a first electronic device is connected to a control device, such as a Bluetooth headset connected to a smartphone, then the Bluetooth headset may redirect the audio sent to the smartphone to another Bluetooth headset. Thereby, redirecting the input received by a microphone of a first Bluetooth headset to a second Bluetooth headset. This allows the second Bluetooth headset hear what a user of the first Bluetooth headset is saying. In particular embodiments, the live audio communication between a first electronic device and a control device may be redirected to one or more second electronic devices in response to a verification of a communications profile associated with each of the one or more second electronic devices. In particular embodiments, the first electronic device may generate a notification confirming redirection of the live audio communication between the first electronic device and the control device to the one or more second electronic devices. As an example and not by way of limitation, the first electronic device may generate a notification to be outputted to the user of the first electronic device to hear a confirmation of redirection of the live audio communication. In particular embodiments, the first electronic device may detect a signal strength between the first electronic device and one or more second electronic devices. The first electronic device may detect that the signal strength between the first electronic device and one or more second electronic devices falls below a threshold signal strength. In particular embodiments, the first electronic device may terminate live audio communication in response to detecting the signal strength falls below the threshold signal strength. As an example and not by way of limitation, a first hearing device may disconnect from a second hearing device in response to detecting the signal strength between the two hearing devices fall below a threshold signal strength. In particular embodiments, a threshold distance may be used based on the threshold signal strength. In particular embodiments, the first electronic device may generate a notification of a termination of the live audio communication. In particular embodiments, the first electronic device may request to connect with a previously connected second electronic device after termination of the live audio communication as a result of the signal strength falling below the threshold signal strength. The first electronic device may periodically send a broadcast message for a specified time period to request to reconnect to a previously connected second device that was disconnected as a result of the signal strength falling below the threshold signal strength. Although this disclosure describes redirecting a live audio communication in a particular, this disclosure contemplates redirecting a live audio communication in any suitable manner.

In particular embodiments, the communications profile may indicate a text keyword may be used to initiate a request for a first electronic device to wirelessly connect to one or more second electronic devices. As an example and not by way of limitation, a user may say a phrase or text keyword to request to connect their hearing device to other hearing devices. A microphone of the first electronic device may be configured to receive an audio input. The first electronic device may detect a text keyword within the audio input. The first electronic device may send the audio input to a control device (e.g., a smartphone) to process the audio input and detect a text keyword. The communications profile used by hearing devices may indicate a text keyword is "Pair". The user may say "Pair" to initiate a process to enable a live audio communication between his or her hearing device to other hearing devices that have the communications profile. In particular embodiments, the communications profile may indicate a particular device and/or a group of particular devices associated with a text keyword or phrase. As an example and not by way of limitation, if Tom wishes to connect his hearing device to a group of hearing devices associated with his family members, then Tom may need to say, "Pair family". As another example and not by way of limitation, if Tom wishes to connect his hearing device to Alice's hearing device, Tom may need to say, "Pair with Alice", "Pair Alice", or the like to his hearing device. Tom's hearing device may broadcast a message using the communications profile to request to connect to Alice's hearing device. Alice's hearing device may be configured to receive any broadcast message from hearing devices requesting to connect or Alice's hearing device may need to be placed into a receiving mode to receive broadcast messages. For instance, Alice may place her device into a receiving mode by saying "Pair". Alternatively, Alice may specifically request to pair with Tom's hearing device saying, "Pair Tom". Users may be able to configure a corresponding text keyword associated with a communications profile of their respective devices. As an example and not by way of limitation, Tom may configure his hearing device to respond to requests comprising "Pair Tom". Users may use an application to perform these configurations. Users may also generate groups of hearing devices to connect to. As an example and not by way of limitation, a user may add one or more second devices to a group such that if the user requests to connect to the group, their hearing device will request to connect to one or more second devices that are in the group. The first electronic device may redirect a live audio communication between the first electronic device and a control device or direct a live audio communication to one or more second electronic devices. In particular embodiments, the first electronic device may identify one or more second electronic devices based on an audio redirection function of a control device. As an example and not by way of limitation, the first electronic device may identify several second hearing devices within a communication range in response to the user saying an audio input comprising the text keyword. The identified several second hearing devices may be configured based on a communications profile to connect to a hearing device that requests to connect to the respective second hearing device. In particular embodiments, the first electronic device may initiate an audio redirection function of the control device in response to the audio input comprising the text keyword. In particular embodiments, the first electronic device may establish a live audio communication in response to the audio input comprising the text keyword (i.e., without a control device). The first electronic device may verify the communications profile of one or more second electronic devices based on the identified one or more second electronic devices. Although this disclosure describes wirelessly connecting a first electronic device to one or more second electronic devices in a particular manner, this disclosure contemplates wirelessly connecting a first electronic device to one or more second electronic devices in any suitable manner.

In particular embodiments, the communications profile may indicate a received motion may be used to initiate a request for a first electronic device to wirelessly connect to one or more second electronic devices. As an example and not by way of limitation, a user may shake his or her hearing device to request to connect their hearing device to other hearing devices. For instance, a user may take one of the earpieces of the hearing device to hold in his or her hand and shake the earpiece. The first hearing device may include an IMU to detect a received motion. The first electronic device may detect a trigger signal in response to the received motion, where the trigger signal is associated with an audio redirection function of a control device or a request to connect to one or more second devices. The first electronic device may send a broadcast message to one or more second electronic devices to request to connect to the one or more second electronic devices. The broadcast message may include a time of the received signal, a type of input received, a device identification, and the like. As an example and not by way of limitation, the broadcast message may include 3:01 PM for the time an input is received, a shake signal is received, and a device identification indicating the device is associated with a first user. The trigger signal may configure the first electronic device to be placed into a listening mode to receive one or more broadcast messages. The trigger signal may configure the first electronic device to send the broadcast message to a control device to process. The control device may be configured to receive one or more broadcast messages from one or more second electronic devices. The first electronic device may use a transceiver to receive one or more broadcast messages indicative of the one or more second electronic devices receiving an input that matches the received motion at a particular time. The control device may process the broadcast messages from one or more second electronic devices, or the first electronic device may process the broadcast messages from the one or more second electronic devices. In particular embodiments, the broadcast messages from the one or more second electronic devices may be processed to determine a same received motion was received at a corresponding second electronic device as a received motion received by the first electronic device. As an example and not by way of limitation, the broadcast message may be processed to determine whether a shake input was received at a second electronic device similarly to a shake input received at a first electronic device. In particular embodiments, the received motion may be customized for particular devices. As an example and not by way of limitation, a communications profile of a first electronic device may be configured to connect (e.g., directly or by redirecting live audio communication as described herein) to a second electronic device if a shake input is received and the first electronic device may be configured to connect to a third electronic device if a double shake input is received. The configurations may be done within an application to specify what received motion indicates a request to connect to a particular hearing device. In particular embodiments, the broadcast messages from the one or more second electronic devices may be processed to determine the input received by the corresponding second electronic device is received within a threshold time period of the input received by the first electronic device. As an example and not by way of limitation, the broadcast message from a second electronic device may be processed to determine that the input was received within 1 second of the input received by the first electronic device. In particular embodiments, the first electronic device may identify one or more second electronic devices that received the same input (i.e., same received motion) within a threshold time period of the input being received by the first electronic device. The first electronic device may verify the communications profile of one or more second electronic devices based on the identified one or more second electronic devices. Although this disclosure describes wirelessly connecting a first electronic device to one or more second electronic devices in a particular manner, this disclosure contemplates wirelessly connecting a first electronic device to one or more second electronic devices in any suitable manner.

In particular embodiments, the communications profile may indicate a touch gesture may be used to initiate a request for a first electronic device to wirelessly connect to one or more second electronic devices. As an example and not by way of limitation, a user may touch a touch sensor of a first electronic device to perform a touch gesture, such as a tap gesture. For instance, a user may tap a touch sensor of an earpiece. The first electronic device may detect a trigger signal in response to the received touch gesture, where the trigger signal is associated with an audio redirection function of a control device or a request to connect to one or more second devices. The first electronic device may send a broadcast message to one or more second electronic devices to request to connect to the one or more second electronic devices. The broadcast message may include a time of the received signal, a type of input received, a device identification, and the like. As an example and not by way of limitation, the broadcast message may include 4:02 PM for the time an input is received, a tap gesture is received, and a device identification indicating the device is associated with a first user. The trigger signal may configure the first electronic device to be placed into a listening mode to receive one or more broadcast messages. The trigger signal may configure the first electronic device to send the broadcast message to a control device to process. The control device may be configured to receive one or more broadcast messages from one or more second electronic devices. The first electronic device may use a transceiver to receive one or more broadcast messages indicative of the one or more second electronic devices receiving an input that matches the touch gesture at a particular time. The control device may process the broadcast messages from one or more second electronic devices, or the first electronic device may process the broadcast messages from the one or more second electronic devices. In particular embodiments, the broadcast messages from the one or more second electronic devices may be processed to determine a same touch gesture was received at a corresponding second electronic device as a touch gesture received by the first electronic device. As an example and not by way of limitation, the broadcast message may be processed to determine whether a touch gesture was received at a second electronic device similarly to a touch gesture received at a first electronic device. In particular embodiments, the touch gesture may be customized for particular devices. As an example and not by way of limitation, a communications profile of a first electronic device may be configured to connect (e.g., directly or by redirecting live audio communication as described herein) to a second electronic device if a tap gesture is received and the first electronic device may be configured to connect to a third electronic device if a double tap gesture is received. The configurations may be done within an application to specify what touch gesture indicates a request to connect to a particular hearing device. In particular embodiments, the broadcast messages from the one or more second electronic devices may be processed to determine the input received by the corresponding second electronic device is received within a threshold time period of the input received by the first electronic device. As an example and not by way of limitation, the broadcast message from a second electronic device may be processed to determine that the input was received within 1 second of the input received by the first electronic device. In particular embodiments, the first electronic device may identify one or more second electronic devices that received the same input (i.e., same touch gesture) within a threshold time period of the input being received by the first electronic device. The first electronic device may verify the communications profile of one or more second electronic devices based on the identified one or more second electronic devices. In particular embodiments, the first electronic device may be configured to receive multiple predetermined inputs to initiate a request for a first electronic device to wirelessly connect to one or more second electronic devices. As an example and not by way of limitation, a user may need to perform a tap gesture on an earpiece of a hearing device to initiate a listening mode where the user may then say an audio input including a text keyword to initiate a request to connect to one or more second electronic devices. Although this disclosure describes wirelessly connecting a first electronic device to one or more second electronic devices in a particular manner, this disclosure contemplates wirelessly connecting a first electronic device to one or more second electronic devices in any suitable manner.

In particular embodiments, the first electronic device may directly connect to one or more second electronic devices. The first electronic device may broadcast a message to one or more second electronic devices to request to connect to the second electronic device. The second electronic device may also broadcast a message to one or more second devices (including the first electronic device) to request to connect to the second electronic device. The second electronic device may similarly process a broadcast message as the first electronic device and/or send the broadcast message to a control device to process. In particular embodiments, the first electronic device may access a device identification of each of the one or more second electronic devices that are within the communication range of the transceiver of the first electronic device. In particular embodiments, the first electronic device may use a control device to access a device identification of each of the one or more second electronic devices within a communication range of the transceiver of the first electronic device. In particular embodiments, the first electronic device may determine whether the first electronic device has been previously connected to each of the second electronic devices within communication range based on the device identification of the one or more second electronic devices. In particular embodiments, the first electronic device may use a control device to determine whether the first electronic device has been previously connected to each of the second electronic devices within communication range based on the device identification of the one or more second electronic devices. In particular embodiments, the verification of the communications profile may comprise determining the first electronic device has been previously connected to the one or more second electronic devices.

Figure 4:
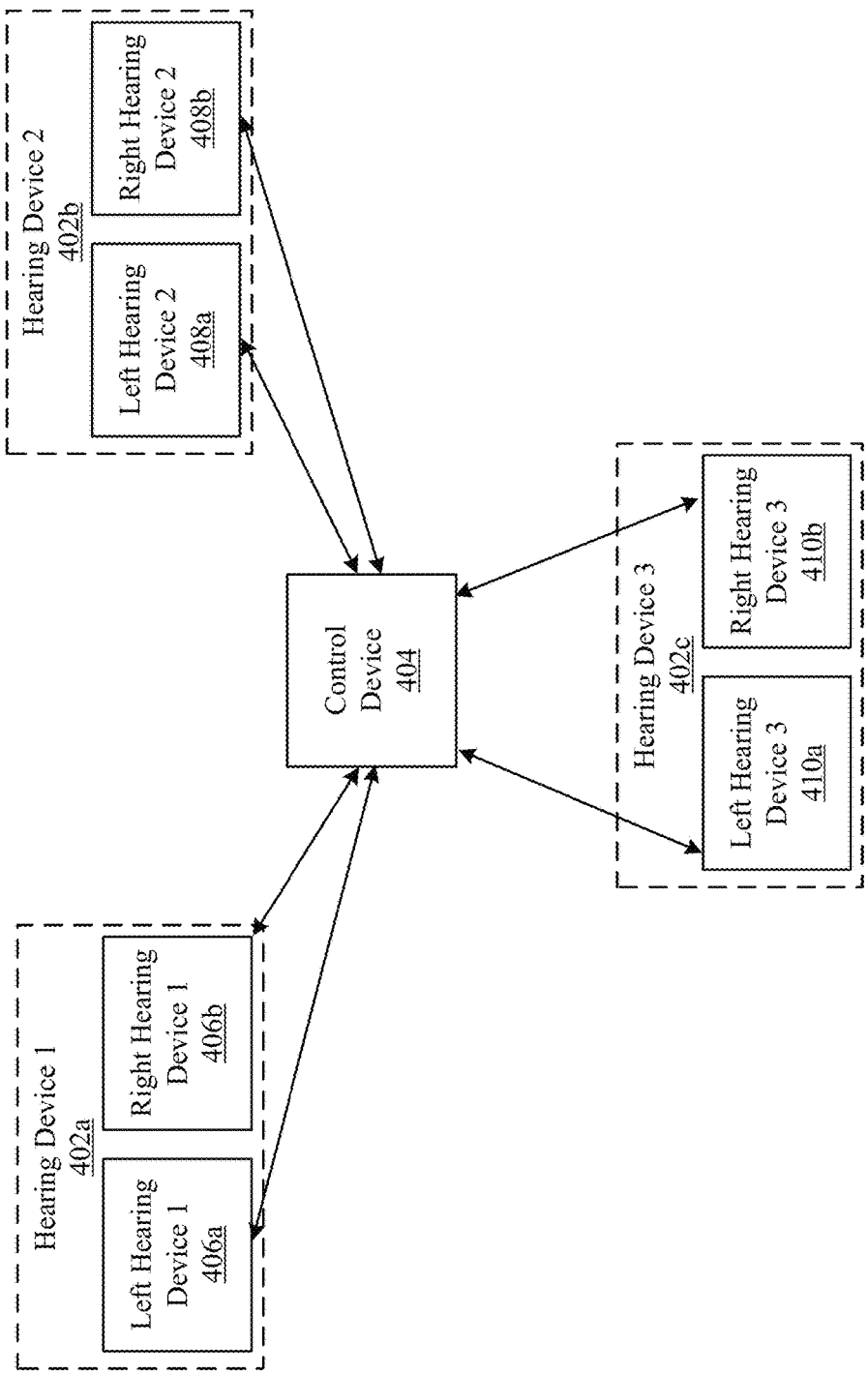
FIG. 4 illustrates an example environment of connecting hearing devices to a control device.

FIG. 4 illustrates an example environment 400 of connecting hearing devices 402 to a control device 404. In particular embodiments, the environment 400 may include a hearing device 1 402a, a hearing device 2 402b, a hearing device 3 402c, and a control device 404. In particular embodiments, each of the hearing devices 402 may be connected to the control device 404 via a wireless connection. As an example and not by way of limitation, the hearing devices 402 may be connected to the control device 404 via Bluetooth. In particular embodiments, hearing device 1 402a may include a left hearing device 1 406a and a right hearing device 1 406b. In particular embodiments, hearing device 2 402b may include a left hearing device 2 408a and a right hearing device 408b. In particular embodiments, hearing device 3 402c may include a left hearing device 3 410a and a right hearing device 3 410b. While a certain number of hearing devices 402 and control device 404 are shown in FIG. 4, this disclosure contemplates any number of hearing devices and control devices 404 wirelessly coupled together. In particular embodiments, the control device 404 may redirect live audio communication from one hearing device 1 402a to hearing device 2 402b and hearing device 3 402c. Similarly, the control device 404 may redirect live audio communication from hearing device 2 402b and hearing device 3 402c to the other hearing devices. To initiate the redirection of the live audio communication, users of the respective hearing devices 402 may input a predetermined input into the hearing devices 402 as described herein.

Figure 5:
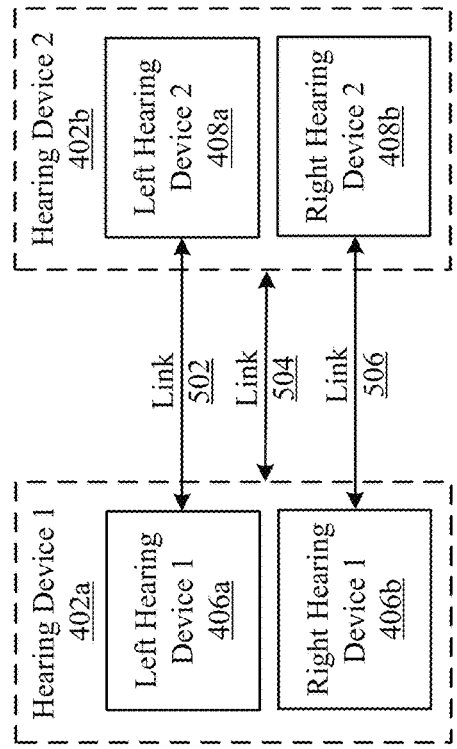
FIG. 5 illustrates an example environment of connecting hearings devices.

FIG. 5 illustrates an example environment 500 of connecting hearing devices 402. In particular embodiments, while two hearing devices 402a, 402b are shown, this disclosure contemplates any number of hearing devices 402 that may directly connect to one another. As an example and not by way of limitation, three hearing devices 402 may directly connect to one another. In particular embodiments, hearing device 1 402a may receive a predetermined input to request to connect to hearing device 2 402b as described herein. The predetermined input may specifically identify hearing device 2 402b or be a general request to connect to another hearing device as described herein. In particular embodiments, hearing device 2 402b may also receive a predetermined input to request to connect to hearing device 1 402a as described herein. The predetermined input received by hearing device 2 402b may specifically identify hearing device 1 402a or be a general request to connect to another hearing device as described herein. After both hearing device 1 402a and hearing device 2 402b receives the predetermined input, both hearing device 1 402a and hearing device 2 402b may be configured to receive a broadcast message as described herein. Each hearing device 402a, 402b may process the received broadcast messages and verify the respective hearing devices 402a, 402b using a communications profile. After verifying the other hearing device 402a, 402b, the hearing devices 402a, 402b may establish a link 504 between the hearing device 1 402a and hearing device 2 402b. In particular embodiments, a link 502 may be established between left hearing device 1 406a and left hearing device 2 408a. In particular embodiments, link 506 may be established between right hearing device 1 406b and right hearing device 2 408b. While connected, a live audio communication may be transferred between the hearing devices 402. As an example and not by way of limitation, an audio input received at left hearing device 1 406a may be transmitted to left hearing device 2 408a and vice versa.

Figure 6B:
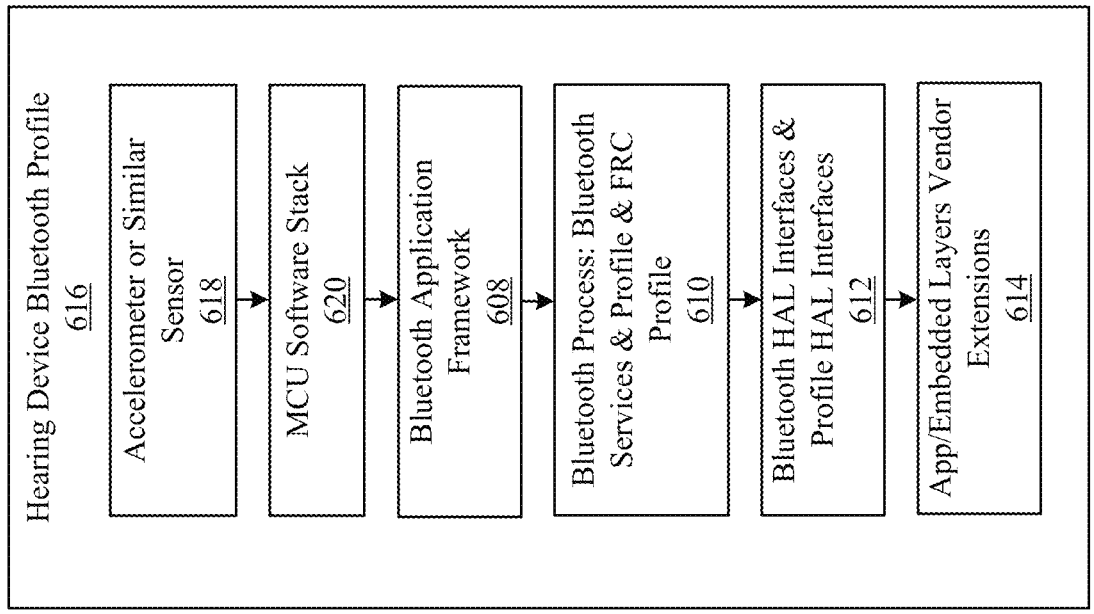
FIGS. 6A-6B illustrate an example Bluetooth profile of a control device and an example Bluetooth profile of a hearing device.
Figure 6A:
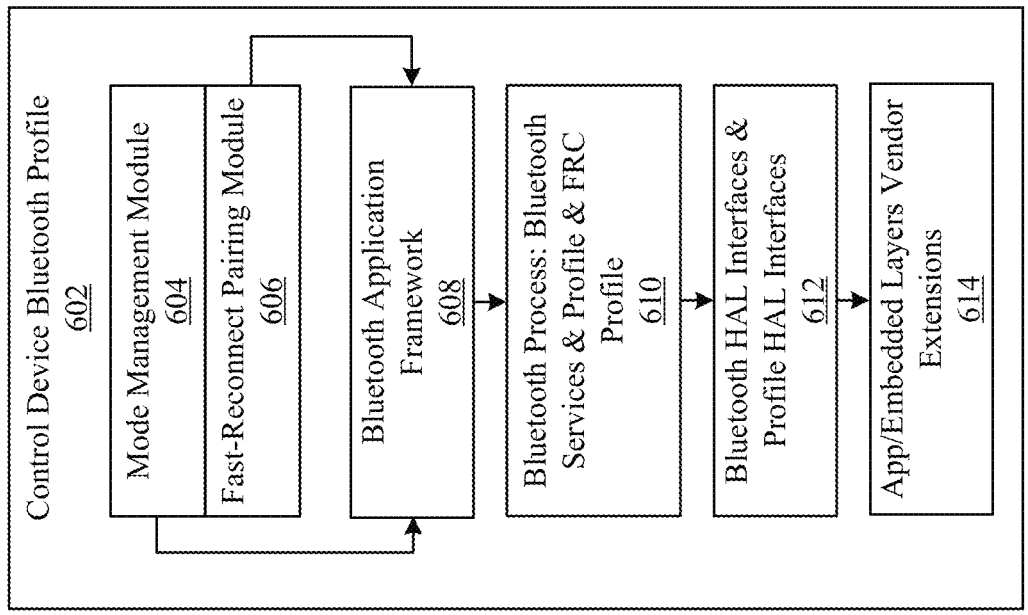

FIGS. 6A-6B illustrate an example control device Bluetooth profile 602 and an example hearing device Bluetooth profile 616. Referring to FIG. 6A, an example control device Bluetooth profile 602 is shown. In particular embodiments, the control device Bluetooth profile 602 may include a mode management module 604, a fast-reconnect pairing module 606, a Bluetooth application framework 608, a Bluetooth process 610, Bluetooth hardware abstraction layer (HAL) interfaces & Profile HAL interfaces 612, and app/embedded layers vender extensions 614. In particular embodiments, the control device Bluetooth profile 602 may be used by a control device to communicate with one or more hearing devices and redirect a live audio communication of the hearing devices to one or more other hearing devices. While a certain configuration is shown for the control device Bluetooth profile 602, the control device Bluetooth profile may include additional or less components arranged in any suitable configuration. As an example and not by way of limitation, the control device Bluetooth profile 602 may not have the mode management module 604. In particular embodiments, the mode management module 604 is configured to enable the control device to change a mode of the hearing devices within a live audio communication. In particular embodiments, the modes may include a live conversation mode and a music mode. The live conversation mode enables two hearing devices to communicate with one another either directly or through a redirecting of live audio communication via the control device. The music mode enables two hearing devices to listen to the same music at the same time. The control device may simultaneously output an audio output (e.g., music or other content) to the hearing devices. In particular embodiments, the fast-reconnect pairing module 606 may enable a control device to manage a hearing device to quickly connect to another hearing device. The fast-reconnect pairing module 606 may redirect a live audio communication from a first hearing device to one or more second hearing devices. In particular embodiments, the Bluetooth application framework 608 may provide easy access to Bluetooth features, such as hardware changes, detecting and monitoring of various synchronous or asynchronous device events, and the like. In particular embodiments, the Bluetooth process 610 may hold various Bluetooth services and profiles, such as Generic Attribute Profile (GATT), FRC profiles, and the like. In particular embodiments, the Bluetooth HAL interfaces & profile HAL interfaces 612 may be configured to interact with one or more software layers by reading the underlying hardware. In particular embodiments, the app/embedded layers vendor extensions 614 may be the final layer of Bluetooth communication channel. In particular embodiments, the app/embedded layers vendor extensions 614 may broadcast messages, search for nearby Bluetooth devices, and present GUI updates to one or more users.

Referring to FIG. 6B, an example hearing device Bluetooth profile 616 is shown. In particular embodiments, the hearing device Bluetooth profile 616 may include an accelerometer 618, MCU software stack 620, Bluetooth application framework 608, Bluetooth process 610, Bluetooth HAL interfaces & Profile HAL interfaces 612, and app/embedded layers vender extensions 614. In particular embodiments, the hearing device Bluetooth profile 616 may be used by a hearing device to communicate with a control device and/or other hearing devices. The hearing device Bluetooth profile 616 may be used by a hearing device to communicate with the control device to redirect a live audio communication between the hearing device and the control device to another hearing device. The hearing device Bluetooth profile 616 may be used by a hearing device to communicate directly with another hearing device. In particular embodiments, the accelerometer 618 may be embodied as another similar sensor to receive a user input. In particular embodiments, the accelerometer 618 may receive a predetermined input indicative of a received motion. As an example and not by way of limitation, the predetermined input may be a shake of an earpiece of a hearing device. As another example and not by way of limitation, if the sensor is a touch sensor, the predetermined input may be a tap gesture on an earpiece of a hearing device. In particular embodiments, the MCU software stack 620 may be configured to read sensor data and timers. The MCU software stack 620 may manage shared resources and other OS capabilities to enable hearing device to function with multiple system tasks. In particular embodiments, the Bluetooth application framework 608 may provide easy access to Bluetooth features, such as hardware changes, detecting and monitoring of various synchronous or asynchronous device events, and the like. In particular embodiments, the Bluetooth process 610 may hold various Bluetooth services and profiles, such as Generic Attribute Profile (GATT), FRC profiles, and the like. In particular embodiments, the Bluetooth HAL interfaces & profile HAL interfaces 612 may be configured to interact with one or more software layers by reading the underlying hardware. In particular embodiments, the app/embedded layers vendor extensions 614 may be the final layer of Bluetooth communication channel. In particular embodiments, the app/embedded layers vendor extensions 614 may broadcast messages, search for nearby Bluetooth devices, and present GUI updates to one or more users.

Figure 7:
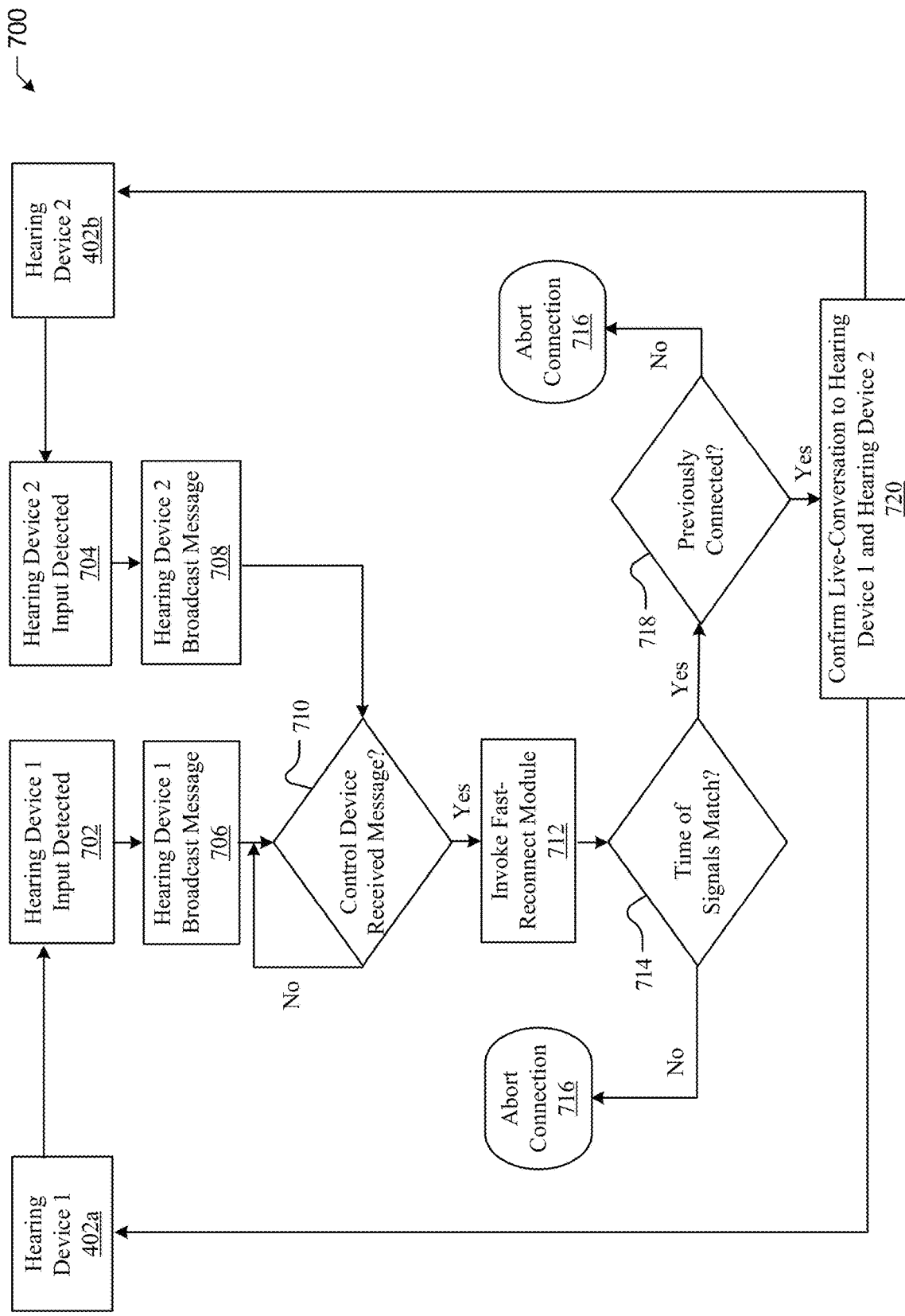
FIG. 7 illustrates an example flowchart of a wireless connection process.

FIG. 7 illustrates an example flowchart of a wireless connection process 700. In particular embodiments, the process 700 start with both a hearing device 1 402a and a hearing device 2 402b detecting an input at step 702 and detecting an input at step 704, respectively. Step 702 and step 704 may occur simultaneously or at least within a threshold time period. At step 706, the hearing device 1 402a may broadcast a message as described herein. The broadcast message may be a request to redirect live audio communication between the hearing device 1 402a and a control device to a hearing device 2 402b. The broadcast message may be a request for the hearing device 1 402a to directly communicate with a hearing device 2 402b. As an example and not by way of limitation, the broadcast message may include one or more of a time an input is received, a type of input received, and a device identification. The broadcast message may include additional or less than those items. The hearing device 1 402a may broadcast the message to any hearing devices and/or a control device within a communication range of the transceiver as described herein. At step 708, the hearing device 2 402b may also broadcast a message as described herein. The broadcast message may be similar to the broadcast message sent by hearing device 1 402a. The hearing device 2 402b may broadcast the message to any hearing devices and/or a control device within a communication range of the transceiver as described herein. At step 710, a control device may determine whether any broadcast messages are received. In particular embodiments, the control device may periodically check to see if any broadcast messages are received from one or more hearing devices. If the control device does not receive a message, the process 700 may loop back to periodically check to see if a message is received. Although not shown, after a predetermined time period, the control device may stop checking to see if a message is received. At step 712, a control device may invoke a fast-reconnect module. The fast-reconnect module may perform an audio redirection function where the control device determines whether to redirect a live audio communication between the control device and a hearing device to another hearing device. At step 714, the control device may determine whether a time of signals match. As an example and not by way of limitation, the control device may determine whether the time an input is received at a hearing device 2 402b is within a threshold time period of when an input is received at a hearing device 1 402a. If the time of the signals do not match or are not within a threshold time period, then the process 700 may continue to step 716 where a connection is aborted. If the time of the signals do match or are within a threshold time period, then the process 700 may continue to step 718 to determine whether the hearing device 1 402*a* and the hearing device 2 402*b* have been previously connected. If the hearing devices 402 have not been previously connected, then the process 700 may continue to step 716 where the connection is aborted. If the hearing devices 402 have been previously connected, then the process 700 may continue to step 720, where a notification is generated to confirm a redirection of live audio communication between a hearing device 1 402*a* and a control device is redirected to a hearing device 2 402*b* and vice versa (i.e., redirection of live audio communication between a hearing device 2 402*b* and a control device is redirected to hearing device 1 402*a*). The notification is sent to each of the hearing devices 402 to output to their respective users. In particular embodiments, while the process 700 is described with a control device as performing one or more of the steps, either of the hearing device 1 402*a* or hearing device 2 402*b* may perform the one or more of the steps of process 700. In particular embodiments, one or more steps of the process 700 may be repositioned and/or removed. As an example and not by way of limitation, the process 700 may not require a check of whether hearing devices have been previously connected in step 718. In particular embodiments, one or more steps may be added to the process 700. Furthermore, although this disclosure describes and illustrates particular components, devices, or systems carrying out particular steps of the method of FIG. 7, this disclosure contemplates any suitable combination of any suitable components, devices, or systems carrying out any suitable steps of the method of FIG. 7.

Figure 8:
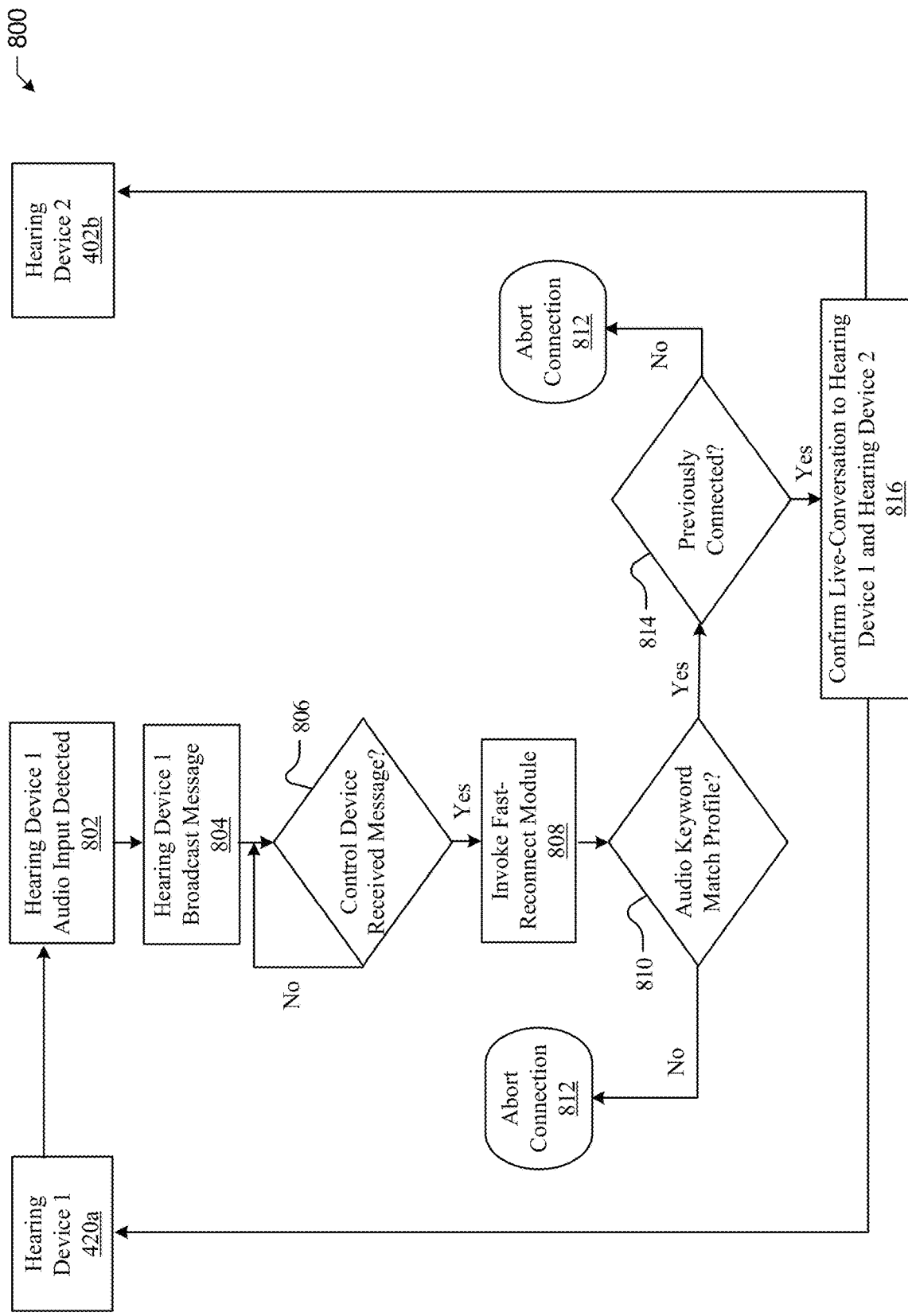
FIG. 8 illustrates another example flowchart of a wireless connection process.

FIG. 8 illustrates another example flowchart of a wireless connection process 800. In particular embodiments, the process 800 may start with a hearing device 1 402*a* receiving an audio input at step 802. In particular embodiments, the hearing device 1 402*a* may receive an audio input comprising a text keyword. The hearing device 1 402*a* may be configured to parse an audio input to detect a text keyword. In particular embodiments, the hearing device 1 402*a* may send the audio input to another device (e.g., a control device) to process the audio input to detect one or more text keywords. In particular embodiments, after the hearing device 1 402*a* detects an audio input, at step 804 the hearing device 1 402*a* may broadcast a message to one or more hearing devices and/or a control device. At step 806, a control device may periodically check to see if a message is received. If a message is not received, the process 800 may loop back so the control device continues to check to see if a message is received. Although not shown, after a predetermined time period, the control device may stop checking to see if a message is received. At step 808, a control device may invoke a fast-reconnect module. The fast-reconnect module may perform an audio redirection function where the control device determines whether to redirect a live audio communication between the control device and a hearing device to another hearing device. At step 810, the control device may determine whether an audio keyword matches a profile of a hearing device. As an example and not by way of limitation, the control device may maintain a list of previously connected hearing devices. Each of the previously connected hearing devices may have a communications profile that indicates whether a text keyword would verify a connection request to establish a live audio communication between the respective hearing device to one or more other hearing devices. If the audio keyword or text keyword detected in the audio input does not match a communications profile of a hearing device 2 402*b* (or another hearing device within a communication range), then the process 800 may continue to step 812 where a connection is aborted. If the audio keyword or text keyword detected in the audio input does match a communications profile of a hearing device 2 402*b* within a communication range of the hearing device 1 402*a*, then the process 800 may continue to step 814, where the control device may determine whether the hearing devices have been previously connected. If the hearing device 2 402*b* has not been previously connected to the control device, then the process may continue to step 812 where the connection is aborted. If the hearing device 2 402*b* has been previously connected to the control device, the process 800 may continue to step 816 where a notification may be generated to confirm a redirection of live audio communication between a hearing device 1 402*a* and a control device is redirected to a hearing device 2 402*b* and vice versa (i.e., redirection of live audio communication between a hearing device 2 402*b* and a control device is redirected to hearing device 1 402*a*). The notification is sent to each of the hearing devices 402 to output to their respective users. In particular embodiments, while the process 800 is described with a control device as performing one or more of the steps, either of the hearing device 1 402*a* or hearing device 2 402*b* may perform the one or more of the steps of process 700. In particular embodiments, one or more steps of the process 800 may be repositioned and/or removed. As an example and not by way of limitation, the process 800 may not require a check of whether hearing devices have been previously connected in step 814. In particular embodiments, one or more steps may be added to the process 800. Furthermore, although this disclosure describes and illustrates particular components, devices, or systems carrying out particular steps of the method of FIG. 8, this disclosure contemplates any suitable combination of any suitable components, devices, or systems carrying out any suitable steps of the method of FIG. 8.

Figure 9A:
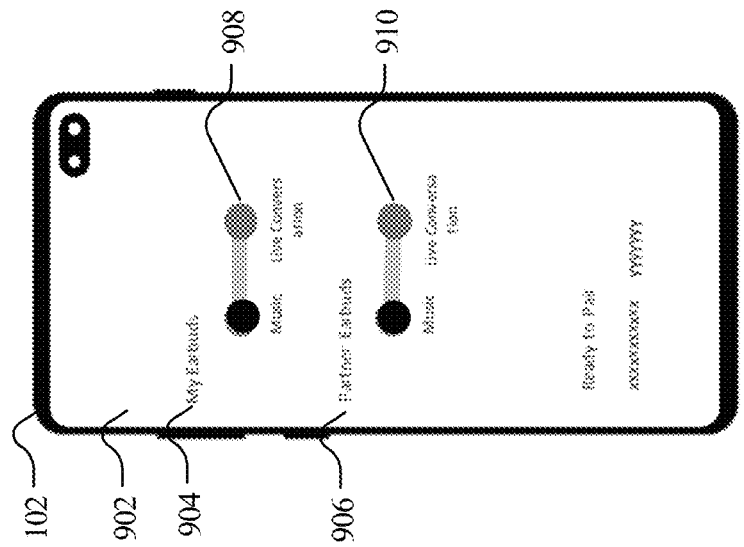
FIGS. 9A-9B illustrate example user interfaces of a control device connected to one or more hearing devices.
Figure 9B:
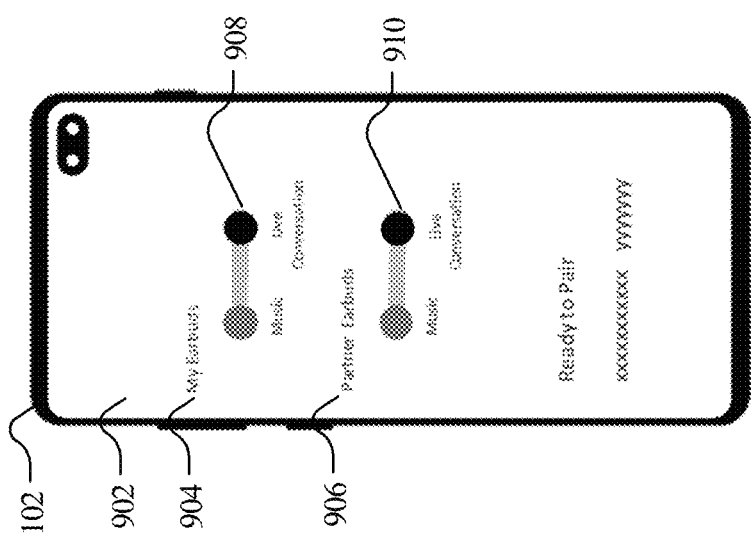

FIGS. 9A-9B illustrates example user interfaces 902 of a control device 102 connected to one or more hearing devices. Referring to FIG. 9A, a user interface 902 is shown on a display of the control device 102. The user interface 902 may include a user interface element 904 for a first hearing device and a user interface element 906 for a second hearing device. Although only two user interface elements are shown, the user interface 902 may include additional user interface elements. As an example and not by way of limitation, the user interface 902 may include additional user interface elements for all previously connected hearing devices. The user interface element 904 for the first hearing device may include an activatable element 908 to switch a mode between a music mode and a live conversation mode. Although only two options are shown for the activatable element 908, there may be additional options. As an example and not by way of limitation, the activatable element 908 may include a disconnect option. In particular embodiments, a user may configure to add one or more hearing devices to a live conversation via the user interface 902. The user may tap the activatable element 908 to select the live conversation mode in order to enable a live conversation mode between one or more hearing devices. In particular embodiments, the user may select to enable a music mode, where an output of the control device 102 is shared between two or more hearing devices as shown in FIG. 9B. In particular embodiments, the user interface 902 may include additional elements not shown that may enable the user to configure one or more predetermined inputs to enable a live conversation between one or more hearing devices as described herein. As an example and not by way of limitation, the user may add one or more predetermined inputs to be associated with a communications profile of one or more hearing devices. For instance, a user may select to add a tap gesture to be linked with a communications profile associated with two hearing devices connected to the control device. By adding the tap gesture to be linked with each communications profile associated with two hearing devices, the two hearing devices may subsequently request to connect to each other directly to enable a live audio communication without the control device. As an example and not by way of limitation, a first user may perform a tap gesture on one of the hearing devices (e.g., one earpiece of the hearing device) while a second user may perform the same tap gesture on the other hearing device (e.g., one earpiece of the hearing device) to request to connect to the other hearing device. Each of the two hearing devices may process the input as described herein to enable the live audio communication between the two hearing devices.

Figure 10:
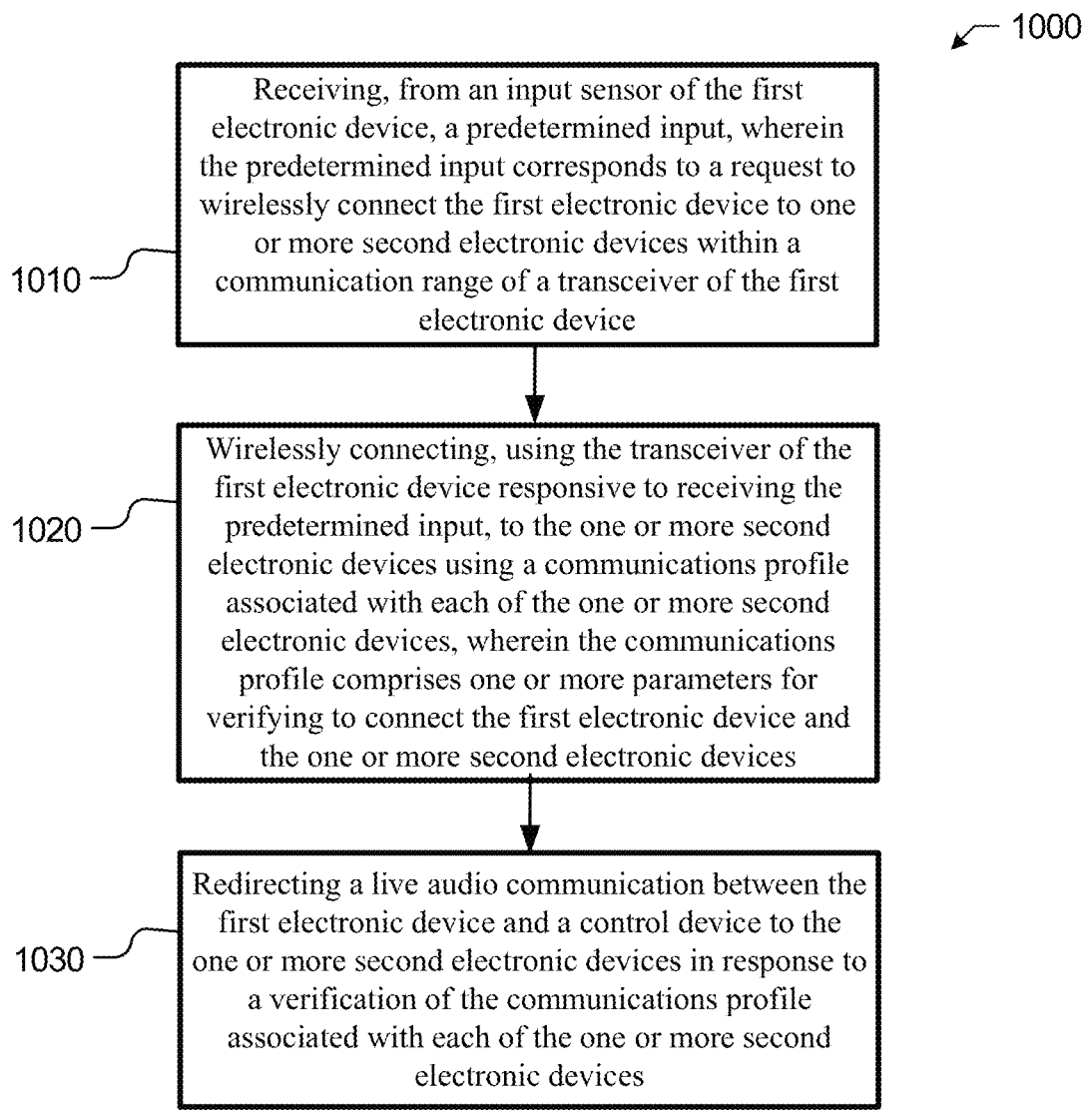
FIG. 10 illustrates an example method for connecting hearing devices.

FIG. 10 illustrates is a flow diagram of a method for connecting hearing devices, in accordance with the presently disclosed embodiments. The method 1000 may be performed utilizing one or more processing devices (e.g., hearing device 202) that may include hardware (e.g., a general purpose processor, a graphic processing unit (GPU), an application-specific integrated circuit (ASIC), a system-on-chip (SoC), a microcontroller, a field-programmable gate array (FPGA), a central processing unit (CPU), an application processor (AP), a visual processing unit (VPU), a neural processing unit (NPU), a neural decision processor (NDP), or any other processing device(s) that may be suitable for processing 2D and 3D image data, software (e.g., instructions running/executing on one or more processors), firmware (e.g., microcode), or some combination thereof.

The method 1000 may begin at step 1010 with the one or more processing devices (e.g., hearing device 202) receiving, from an input sensor of the first electronic device, a predetermined input. For example, in particular embodiments, the predetermined input may correspond to a request to wirelessly connect the first electronic device to one or more second electronic devices within a communication range of a transceiver of the first electronic device. The method 1000 may then continue at step 1020 with the one or more processing devices (e.g., hearing device 202) wirelessly connecting, using the transceiver of the first electronic device responsive to receiving the predetermined input, to the one or more second electronic devices using a communications profile associated with each of the one or more second electronic devices. For example, in particular embodiments, the communications profile may comprise one or more parameters for verifying to connect the first electronic device and the one or more second electronic devices. The method 1000 may then continue at step 1030 with the one or more processing devices (e.g., hearing device 202) redirecting a live audio communication between the first electronic device and a control device to the one or more second electronic devices in response to a verification of the communications profile associated with each of the one or more second electronic devices. Particular embodiments may repeat one or more steps of the method of FIG. 10, where appropriate. Although this disclosure describes and illustrates particular steps of the method of FIG. 10 as occurring in a particular order, this disclosure contemplates any suitable steps of the method of FIG. 10 occurring in any suitable order. Moreover, although this disclosure describes and illustrates an example method for connecting hearing devices including the particular steps of the method of FIG. 10, this disclosure contemplates any suitable method for connecting hearing devices including any suitable steps, which may include all, some, or none of the steps of the method of FIG. 10, where appropriate. Furthermore, although this disclosure describes and illustrates particular components, devices, or systems carrying out particular steps of the method of FIG. 10, this disclosure contemplates any suitable combination of any suitable components, devices, or systems carrying out any suitable steps of the method of FIG. 10.

AI Architecture

Figure 11:
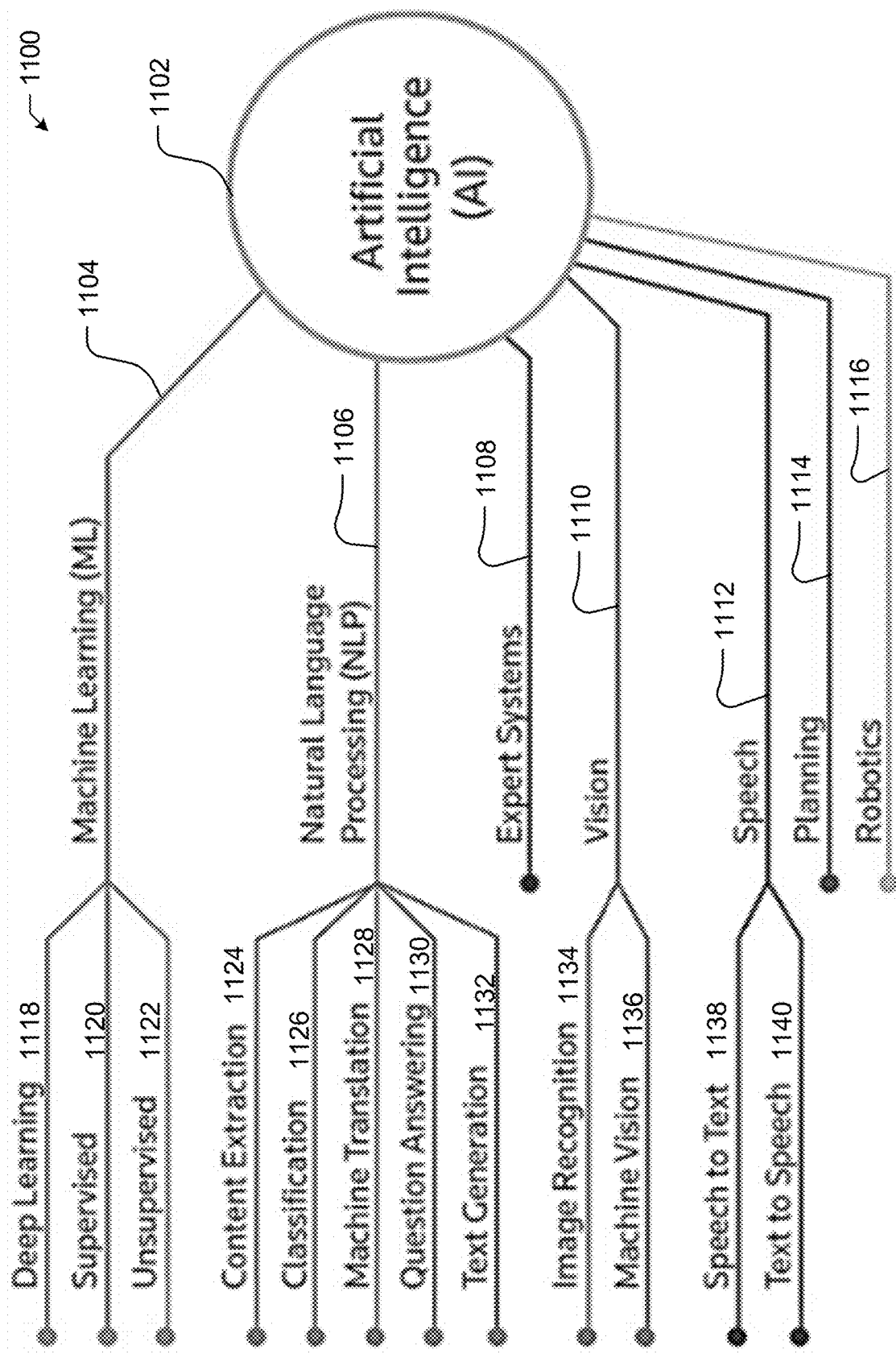
FIG. 11 illustrates a diagram of an example artificial intelligence (AI) architecture.

FIG. 11 illustrates a diagram 1100 of an example artificial intelligence (AI) architecture 1102 that may be utilized to perform connecting hearing devices, in accordance with the presently disclosed embodiments. In particular embodiments, the AI architecture 1102 may be implemented utilizing, for example, one or more processing devices that may include hardware (e.g., a general purpose processor, a graphic processing unit (GPU), an application-specific integrated circuit (ASIC), a system-on-chip (SoC), a microcontroller, a field-programmable gate array (FPGA), a central processing unit (CPU), an application processor (AP), a visual processing unit (VPU), a neural processing unit (NPU), a neural decision processor (NDP), and/or other processing device(s) that may be suitable for processing various data and making one or more decisions based thereon), software (e.g., instructions running/executing on one or more processing devices), firmware (e.g., microcode), or some combination thereof.

In particular embodiments, as depicted by FIG. 11, the AI architecture 1102 may include machine leaning (ML) algorithms and functions 1104, natural language processing (NLP) algorithms and functions 1106, expert systems 1108, computer-based vision algorithms and functions 1110, speech recognition algorithms and functions 1112, planning algorithms and functions 1114, and robotics algorithms and functions 1116. In particular embodiments, the ML algorithms and functions 1104 may include any statistics-based algorithms that may be suitable for finding patterns across large amounts of data (e.g., "Big Data" such as user click data or other user interactions, text data, image data, video data, audio data, speech data, numbers data, and so forth). For example, in particular embodiments, the ML algorithms and functions 1104 may include deep learning algorithms 1118, supervised learning algorithms 1120, and unsupervised learning algorithms 1122.

In particular embodiments, the deep learning algorithms 1118 may include any artificial neural networks (ANNs) that may be utilized to learn deep levels of representations and abstractions from large amounts of data. For example, the deep learning algorithms 1118 may include ANNs, such as a multilayer perceptron (MLP), an autoencoder (AE), a convolution neural network (CNN), a recurrent neural network (RNN), long short term memory (LSTM), a grated recurrent unit (GRU), a restricted Boltzmann Machine (RBM), a deep belief network (DBN), a bidirectional recurrent deep neural network (BRDNN), a generative adversarial network (GAN), and deep Q-networks, a neural autoregressive distribution estimation (NADE), an adversarial network (AN), attentional models (AM), deep reinforcement learning, and so forth.

In particular embodiments, the supervised learning algorithms 1120 may include any algorithms that may be utilized to apply, for example, what has been learned in the past to new data using labeled examples for predicting future events. For example, starting from the analysis of a known training dataset, the supervised learning algorithms 1120 may produce an inferred function to make predictions about the output values. The supervised learning algorithms 1120 can also compare its output with the correct and intended output and find errors in order to modify the supervised learning algorithms 1120 accordingly. On the other hand, the unsupervised learning algorithms 1122 may include any algorithms that may applied, for example, when the data used to train the unsupervised learning algorithms 1122 are neither classified or labeled. For example, the unsupervised learning algorithms 1122 may study and analyze how systems may infer a function to describe a hidden structure from unlabeled data.

In particular embodiments, the NLP algorithms and functions 1106 may include any algorithms or functions that may be suitable for automatically manipulating natural language, such as speech and/or text. For example, in particular embodiments, the NLP algorithms and functions 1106 may include content extraction algorithms or functions 1124, classification algorithms or functions 1126, machine translation algorithms or functions 1128, question answering (QA) algorithms or functions 1130, and text generation algorithms or functions 1132. In particular embodiments, the content extraction algorithms or functions 1124 may include a means for extracting text or images from electronic documents (e.g., webpages, text editor documents, and so forth) to be utilized, for example, in other applications.

In particular embodiments, the classification algorithms or functions 1126 may include any algorithms that may utilize a supervised learning model (e.g., logistic regression, naïve Bayes, stochastic gradient descent (SGD), k-nearest neighbors, decision trees, random forests, support vector machine (SVM), and so forth) to learn from the data input to the supervised learning model and to make new observations or classifications based thereon. The machine translation algorithms or functions 1128 may include any algorithms or functions that may be suitable for automatically converting source text in one language, for example, into text in another language. The QA algorithms or functions 1130 may include any algorithms or functions that may be suitable for automatically answering questions posed by humans in, for example, a natural language, such as that performed by voice-controlled personal assistant devices. The text generation algorithms or functions 1132 may include any algorithms or functions that may be suitable for automatically generating natural language texts.

In particular embodiments, the expert systems 1108 may include any algorithms or functions that may be suitable for simulating the judgment and behavior of a human or an organization that has expert knowledge and experience in a particular field (e.g., stock trading, medicine, sports statistics, and so forth). The computer-based vision algorithms and functions 1110 may include any algorithms or functions that may be suitable for automatically extracting information from images (e.g., photo images, video images). For example, the computer-based vision algorithms and functions 1110 may include image recognition algorithms 1134 and machine vision algorithms 1136. The image recognition algorithms 1134 may include any algorithms that may be suitable for automatically identifying and/or classifying objects, places, people, and so forth that may be included in, for example, one or more image frames or other displayed data. The machine vision algorithms 1136 may include any algorithms that may be suitable for allowing computers to "see", or, for example, to rely on image sensors cameras with specialized optics to acquire images for processing, analyzing, and/or measuring various data characteristics for decision making purposes.

In particular embodiments, the speech recognition algorithms and functions 1112 may include any algorithms or functions that may be suitable for recognizing and translating spoken language into text, such as through automatic speech recognition (ASR), computer speech recognition, speech-to-text (STT), or text-to-speech (TTS) in order for the computing to communicate via speech with one or more users, for example. In particular embodiments, the planning algorithms and functions 1138 may include any algorithms or functions that may be suitable for generating a sequence of actions, in which each action may include its own set of preconditions to be satisfied before performing the action. Examples of AI planning may include classical planning, reduction to other problems, temporal planning, probabilistic planning, preference-based planning, conditional planning, and so forth. Lastly, the robotics algorithms and functions 1140 may include any algorithms, functions, or systems that may enable one or more devices to replicate human behavior through, for example, motions, gestures, performance tasks, decision-making, emotions, and so forth.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Systems and Methods

Figure 12:
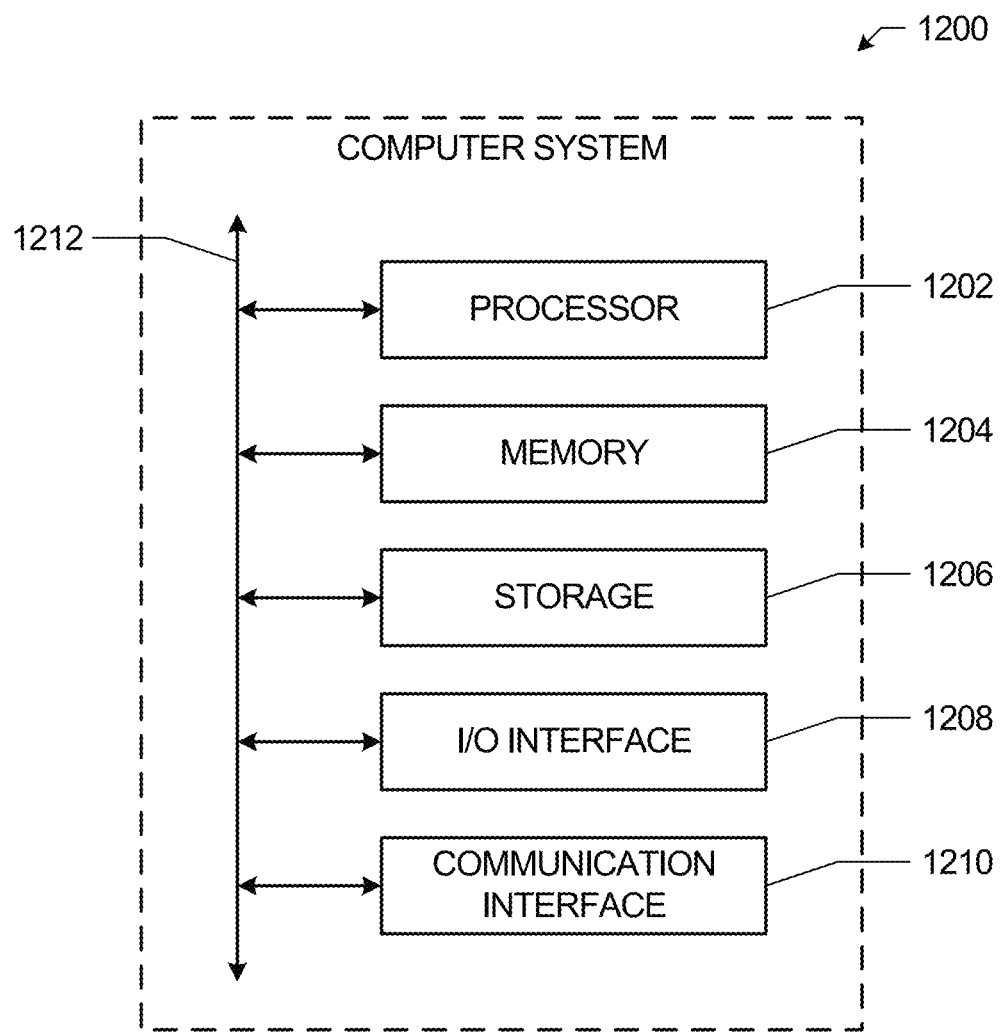
FIG. 12 illustrates an example computer system.

FIG. 12 illustrates an example computer system 1200 that may be utilized to perform connecting hearing devices, in accordance with the presently disclosed embodiments. In particular embodiments, one or more computer systems 1200 perform one or more steps of one or more methods described or illustrated herein. In particular embodiments, one or more computer systems 1200 provide functionality described or illustrated herein. In particular embodiments, software running on one or more computer systems 1200 performs one or more steps of one or more methods described or illustrated herein or provides functionality described or illustrated herein. Particular embodiments include one or more portions of one or more computer systems 1200. Herein, reference to a computer system may encompass a computing device, and vice versa, where appropriate. Moreover, reference to a computer system may encompass one or more computer systems, where appropriate.

This disclosure contemplates any suitable number of computer systems 1200. This disclosure contemplates computer system 1200 taking any suitable physical form. As example and not by way of limitation, computer system 1200 may be an embedded computer system, a system-on-chip (SOC), a single-board computer system (SBC) (e.g., a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 1200 may include one or more computer systems 1200; be unitary or distributed; span multiple locations; span multiple machines; span multiple data centers; or reside in a cloud, which may include one or more cloud components in one or more networks.

Where appropriate, one or more computer systems 1200 may perform without substantial spatial or temporal limitation one or more steps of one or more methods described or illustrated herein. As an example, and not by way of limitation, one or more computer systems 1200 may perform in real time or in batch mode one or more steps of one or more methods described or illustrated herein. One or more computer systems 1200 may perform at different times or at different locations one or more steps of one or more methods described or illustrated herein, where appropriate.

In particular embodiments, computer system 1200 includes a processor 1202, memory 1204, storage 1206, an input/output (I/O) interface 1208, a communication interface 1210, and a bus 1212. Although this disclosure describes and illustrates a particular computer system having a particular number of particular components in a particular arrangement, this disclosure contemplates any suitable computer system having any suitable number of any suitable components in any suitable arrangement. In particular embodiments, processor 1202 includes hardware for executing instructions, such as those making up a computer program. As an example, and not by way of limitation, to execute instructions, processor 1202 may retrieve (or fetch) the instructions from an internal register, an internal cache, memory 1204, or storage 1206; decode and execute them; and then write one or more results to an internal register, an internal cache, memory 1204, or storage 1206. In particular embodiments, processor 1202 may include one or more internal caches for data, instructions, or addresses. This disclosure contemplates processor 1202 including any suitable number of any suitable internal caches, where appropriate. As an example, and not by way of limitation, processor 1202 may include one or more instruction caches, one or more data caches, and one or more translation lookaside buffers (TLBs). Instructions in the instruction caches may be copies of instructions in memory 1204 or storage 1206, and the instruction caches may speed up retrieval of those instructions by processor 1202.

Data in the data caches may be copies of data in memory 1204 or storage 1206 for instructions executing at processor 1202 to operate on; the results of previous instructions executed at processor 1202 for access by subsequent instructions executing at processor 1202 or for writing to memory 1204 or storage 1206; or other suitable data. The data caches may speed up read or write operations by processor 1202. The TLBs may speed up virtual-address translation for processor 1202. In particular embodiments, processor 1202 may include one or more internal registers for data, instructions, or addresses. This disclosure contemplates processor 1202 including any suitable number of any suitable internal registers, where appropriate. Where appropriate, processor 1202 may include one or more arithmetic logic units (ALUs); be a multi-core processor; or include one or more processors 1202. Although this disclosure describes and illustrates a particular processor, this disclosure contemplates any suitable processor.

In particular embodiments, memory 1204 includes main memory for storing instructions for processor 1202 to execute or data for processor 1202 to operate on. As an example, and not by way of limitation, computer system 1200 may load instructions from storage 1206 or another source (such as, for example, another computer system 1200) to memory 1204. Processor 1202 may then load the instructions from memory 1204 to an internal register or internal cache. To execute the instructions, processor 1202 may retrieve the instructions from the internal register or internal cache and decode them. During or after execution of the instructions, processor 1202 may write one or more results (which may be intermediate or final results) to the internal register or internal cache. Processor 1202 may then write one or more of those results to memory 1204. In particular embodiments, processor 1202 executes only instructions in one or more internal registers or internal caches or in memory 1204 (as opposed to storage 1206 or elsewhere) and operates only on data in one or more internal registers or internal caches or in memory 1204 (as opposed to storage 1206 or elsewhere).

One or more memory buses (which may each include an address bus and a data bus) may couple processor 1202 to memory 1204. Bus 1212 may include one or more memory buses, as described below. In particular embodiments, one or more memory management units (MMUs) reside between processor 1202 and memory 1204 and facilitate accesses to memory 1204 requested by processor 1202. In particular embodiments, memory 1204 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1204 may include one or more memory devices 1204, where appropriate. Although this disclosure describes and illustrates particular memory, this disclosure contemplates any suitable memory.

In particular embodiments, storage 1206 includes mass storage for data or instructions. As an example, and not by way of limitation, storage 1206 may include a hard disk drive (HDD), a floppy disk drive, flash memory, an optical disc, a magneto-optical disc, magnetic tape, or a Universal Serial Bus (USB) drive or a combination of two or more of these. Storage 1206 may include removable or non-removable (or fixed) media, where appropriate. Storage 1206 may be internal or external to computer system 1200, where appropriate. In particular embodiments, storage 1206 is non-volatile, solid-state memory. In particular embodiments, storage 1206 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1206 taking any suitable physical form. Storage 1206 may include one or more storage control units facilitating communication between processor 1202 and storage 1206, where appropriate. Where appropriate, storage 1206 may include one or more storages 1206. Although this disclosure describes and illustrates particular storage, this disclosure contemplates any suitable storage.

In particular embodiments, I/O interface 1208 includes hardware, software, or both, providing one or more interfaces for communication between computer system 1200 and one or more I/O devices. Computer system 1200 may include one or more of these I/O devices, where appropriate. One or more of these I/O devices may enable communication between a person and computer system 1200. As an example, and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1206 for them. Where appropriate, I/O interface 1208 may include one or more device or software drivers enabling processor 1202 to drive one or more of these I/O devices. I/O interface 1208 may include one or more I/O interfaces 1206, where appropriate. Although this disclosure describes and illustrates a particular I/O interface, this disclosure contemplates any suitable I/O interface.

In particular embodiments, communication interface 1210 includes hardware, software, or both providing one or more interfaces for communication (such as, for example, packet-based communication) between computer system 1200 and one or more other computer systems 1200 or one or more networks. As an example, and not by way of limitation, communication interface 1210 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1210 for it.

As an example, and not by way of limitation, computer system 1200 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1200 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1200 may include any suitable communication interface 1210 for any of these networks, where appropriate. Communication interface 1210 may include one or more communication interfaces 1210, where appropriate. Although this disclosure describes and illustrates a particular communication interface, this disclosure contemplates any suitable communication interface.

In particular embodiments, bus 1212 includes hardware, software, or both coupling components of computer system 1200 to each other. As an example, and not by way of limitation, bus 1212 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1212 may include one or more buses 1212, where appropriate. Although this disclosure describes and illustrates a particular bus, this disclosure contemplates any suitable bus or interconnect.

MISCELLANEOUS

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

Herein, "automatically" and its derivatives means "without human intervention," unless expressly indicated otherwise or indicated otherwise by context.

The embodiments disclosed herein are only examples, and the scope of this disclosure is not limited to them. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:
1. A first electronic device comprising:
    a transceiver;
    an input sensor;
    a processor coupled to the transceiver and the input sensor; and a memory coupled to the processor, the memory including instructions executable by the processor to:

receive a predetermined input, wherein the predetermined input corresponds to a request to wirelessly connect the first electronic device to one or more second electronic devices within a communication range of the transceiver;

wirelessly connect, responsive to receiving the predetermined input, to the one or more second electronic devices using a communications profile associated with each of the one or more second electronic devices, wherein the communications profile comprises one or more parameters for verifying to connect the first electronic device and the one or more second electronic devices; and in response to a verification of the communications profile associated with each of the one or more second electronic devices, redirect a live audio communication comprising audio content being transmitted between the first electronic device and a control device to the one or more second electronic devices so that, after redirection, the first electronic device and the second electronic device communicate directly with each other during the live audio communication without input from the control device.

2. The first electronic device of claim 1, wherein the input sensor comprises a microphone, wherein the predetermined input comprises an audio input, and wherein the instructions are further executable by the processor to:

detect, responsive to receiving the predetermined input, a text keyword based on the audio input, wherein the text keyword is associated with an audio redirection function of the control device; and identify the one or more second electronic devices based on the audio redirection function of the control device, wherein the verification of the communications profile comprises verifying the identified one or more second electronic devices.

3. The first electronic device of claim 1, wherein the input sensor comprises an inertial measurement unit, wherein the predetermined input comprises a received motion, and wherein the instructions are further executable by the processor to:

detect, responsive to receiving the predetermined input, a trigger signal based on the received motion, wherein the trigger signal is associated with an audio redirection function of the control device;

receive, responsive to the trigger signal via the transceiver from the one or more second electronic devices, one or more broadcast messages indicative of the one or more second electronic devices receiving an input that matches the received motion at a particular time; and identify the one or more second electronic devices that received the input within a threshold time period of the received motion being received by the first electronic device based on the broadcast messages, wherein the verification of the communications profile comprises verifying the identified one or more second electronic devices.

4. The first electronic device of claim 1, wherein the input sensor comprises a touch sensor, wherein the predetermined input comprises a touch gesture, and wherein the instructions are further executable by the processor to:

detect, responsive to receiving the predetermined input, a trigger signal based on the touch gesture, wherein the trigger signal is associated with an audio redirection function of the control device;

receive, responsive to the trigger signal via the transceiver from the one or more second electronic devices, one or more broadcast messages indicative of the one or more second electronic devices receiving an input that matches the touch gesture at a particular time; and identify the one or more second electronic devices that received the input within a threshold time period of the touch gesture being received by the first electronic device based on the broadcast messages, wherein the verification of the communications profile comprises verifying the identified one or more second electronic devices.

5. The first electronic device of claim 1, wherein the instructions are further executable by the processor to:

generate a notification confirming redirection of the live audio communication between the first electronic device and the control device to the one or more second electronic devices.

6. The first electronic device of claim 1, wherein the instructions are further executable by the processor to:

detect a signal strength between the first electronic device and the one or more second electronic devices falls below a threshold signal strength; and terminate the live audio communication in response to detecting the signal strength falls below the threshold signal strength.

7. The first electronic device of claim 1, wherein the instructions are further executable by the processor to:

access a device identification of each of the one or more second electronic devices; and determine whether the first electronic device has been previously connected to each of the one or more second electronic devices based on the respective device identification of the one or more second electronic devices, wherein the verification of the communications profile comprises determining the first electronic device has been previously connected to the one or more second electronic devices.

8. A method comprising, by a first electronic device:

receiving, from an input sensor of the first electronic device, a predetermined input, wherein the predetermined input corresponds to a request to wirelessly connect the first electronic device to one or more second electronic devices within a communication range of a transceiver of the first electronic device;

wirelessly connecting, using the transceiver of the first electronic device responsive to receiving the predetermined input, to the one or more second electronic devices using a communications profile associated with each of the one or more second electronic devices, wherein the communications profile comprises one or more parameters for verifying to connect the first electronic device and the one or more second electronic devices; and in response to a verification of the communications profile associated with each of the one or more second electronic devices, redirecting a live audio communication comprising audio content being transmitted between the first electronic device and a control device to the one or more second electronic devices so that, after redirection, the first electronic device and the second electronic device communicate directly with each other during the live audio communication without input from the control device.

9. The method of claim 8, wherein the input sensor comprises a microphone, wherein the predetermined input comprises an audio input, and further comprising:
- detecting, responsive to receiving the predetermined input, a text keyword based on the audio input, wherein the text keyword is associated with an audio redirection function of the control device; and
- identifying the one or more second electronic devices based on the audio redirection function of the control device, wherein the verification of the communications profile comprises verifying the identified one or more second electronic devices.

10. The method of claim 8, wherein the input sensor comprises an inertial measurement unit, wherein the predetermined input comprises a received motion, and further comprising:
- detecting, responsive to receiving the predetermined input, a trigger signal based on the received motion, wherein the trigger signal is associated with an audio redirection function of the control device;
- receiving, responsive to the trigger signal via the transceiver from the one or more second electronic devices, one or more broadcast messages indicative of the one or more second electronic devices receiving an input that matches the received motion at a particular time; and
- identifying the one or more second electronic devices that received the input within a threshold time period of the received motion being received by the first electronic device based on the broadcast messages, wherein the verification of the communications profile comprises verifying the identified one or more second electronic devices.

11. The method of claim 8, wherein the input sensor comprises a touch sensor, wherein the predetermined input comprises a touch gesture, and further comprising:
- detecting, responsive to receiving the predetermined input, a trigger signal based on the touch gesture, wherein the trigger signal is associated with an audio redirection function of the control device;
- receiving, responsive to the trigger signal via the transceiver from the one or more second electronic devices, one or more broadcast messages indicative of the one or more second electronic devices receiving an input that matches the touch gesture at a particular time; and
- identifying the one or more second electronic devices that received the input within a threshold time period of the touch gesture being received by the first electronic device based on the broadcast messages, wherein the verification of the communications profile comprises verifying the identified one or more second electronic devices.

12. The method of claim 8, further comprising:
generating a notification confirming redirection of the live audio communication between the first electronic device and the control device to the one or more second electronic devices.

13. The method of claim 8, further comprising:
detecting a signal strength between the first electronic device and the one or more second electronic devices falls below a threshold signal strength; and
terminating the live audio communication in response to detecting the signal strength falls below the threshold signal strength.

14. The method of claim 8, further comprising:
accessing a device identification of each of the one or more second electronic devices; and
determining whether the first electronic device has been previously connected to each of the one or more second electronic devices based on the respective device identification of the one or more second electronic devices, wherein the verification of the communications profile comprises determining the first electronic device has been previously connected to the one or more second electronic devices.

15. A computer-readable non-transitory storage media comprising instructions executable by a processor of a first electronic device to:
- receive, from an input sensor of the first electronic device, a predetermined input, wherein the predetermined input corresponds to a request to wirelessly connect the first electronic device to one or more second electronic devices within a communication range of a transceiver of the first electronic device;
- wirelessly connect, using the transceiver of the first electronic device responsive to receiving the predetermined input, to the one or more second electronic devices using a communications profile associated with each of the one or more second electronic devices, wherein the communications profile comprises one or more parameters for verifying to connect the first electronic device and the one or more second electronic devices; and
- in response to a verification of the communications profile associated with each of the one or more second electronic devices, redirect a live audio communication comprising audio content being transmitted between the first electronic device and a control device to the one or more second electronic devices so that, after redirection, the first electronic device and the second electronic device communicate directly with each other during the live audio communication without input from the control device.

16. The media of claim 15, wherein the input sensor comprises a microphone, wherein the predetermined input comprises an audio input, and wherein the instructions are further executable by the processor to:
- detect, responsive to receiving the predetermined input, a text keyword based on the audio input, wherein the text keyword is associated with an audio redirection function of the control device; and
- identify the one or more second electronic devices based on the audio redirection function of the control device, wherein the verification of the communications profile comprises verifying the identified one or more second electronic devices.

17. The media of claim 15, wherein the input sensor comprises an inertial measurement unit, wherein the predetermined input comprises a received motion, and wherein the instructions are further executable by the processor to:
- detect, responsive to receiving the predetermined input, a trigger signal based on the received motion, wherein the trigger signal is associated with an audio redirection function of the control device;
- receive, responsive to the trigger signal via the transceiver from the one or more second electronic devices, one or more broadcast messages indicative of the one or more second electronic devices receiving an input that matches the received motion at a particular time; and
- identify the one or more second electronic devices that received the input within a threshold time period of the received motion being received by the first electronic device based on the broadcast messages, wherein the verification of the communications profile comprises verifying the identified one or more second electronic devices.

18. The media of claim 15, wherein the input sensor comprises a touch sensor, wherein the predetermined input comprises a touch gesture, and wherein the instructions are further executable by the processor to:
  detect, responsive to receiving the predetermined input, a trigger signal based on the touch gesture, wherein the trigger signal is associated with an audio redirection function of the control device;
  receive, responsive to the trigger signal via the transceiver from the one or more second electronic devices, one or more broadcast messages indicative of the one or more second electronic devices receiving an input that matches the touch gesture at a particular time; and
  identify the one or more second electronic devices that received the input within a threshold time period of the touch gesture being received by the first electronic device based on the broadcast messages, wherein the verification of the communications profile comprises verifying the identified one or more second electronic devices.

19. The media of claim 15, wherein the instructions are further executable by the processor to:
  generate a notification confirming redirection of the live audio communication between the first electronic device and the control device to the one or more second electronic devices.

20. The media of claim 15, wherein the instructions are further executable by the processor to:
  detect a signal strength between the first electronic device and the one or more second electronic devices falls below a threshold signal strength; and
  terminate the live audio communication in response to detecting the signal strength falls below the threshold signal strength.

* * * * *